United States Patent
Misawa et al.

(10) Patent No.: US 8,150,208 B2
(45) Date of Patent: Apr. 3, 2012

(54) IMAGE PICKUP APPARATUS HAVING STABILITY CHECKER FOR SPECIFIC OBJECT FEATURE VALUE, AND PROGRAM AND METHOD FOR CONTROL OF IMAGE PICKUP INCLUDING CHECKING STABILITY OF SPECIFIC OBJECT FEATURE VALUE

(75) Inventors: Takeshi Misawa, Saitama (JP); Masahiko Sugimoto, Saitama (JP)

(73) Assignee: FUJIFILM Corporation, Tokyo (JP)

(*) Notice: Subject to any disclaimer, the term of this patent is extended or adjusted under 35 U.S.C. 154(b) by 1137 days.

(21) Appl. No.: 11/963,398

(22) Filed: Dec. 21, 2007

(65) Prior Publication Data
US 2008/0187185 A1    Aug. 7, 2008

(30) Foreign Application Priority Data
Feb. 5, 2007    (JP) .................. 2007-025837

(51) Int. Cl.
  G06K 9/00    (2006.01)
  G06K 9/20    (2006.01)
  G06K 9/36    (2006.01)
  G03B 17/00    (2006.01)
(52) U.S. Cl. .......... 382/282; 382/118; 382/312; 396/52; 396/55
(58) Field of Classification Search .................. 382/118, 382/312, 313, 282–286, 275; 396/52, 55
  See application file for complete search history.

(56) References Cited

U.S. PATENT DOCUMENTS

| | | | |
|---|---|---|---|
| 6,507,366 B1* | 1/2003 | Lee | 348/352 |
| 7,014,102 B2* | 3/2006 | Oohashi | 235/375 |
| 7,376,347 B2* | 5/2008 | Sugimoto | 396/60 |
| 7,394,943 B2* | 7/2008 | Kinney et al. | 382/255 |
| 2004/0218916 A1* | 11/2004 | Yamaguchi et al. | 396/263 |
| 2005/0219395 A1* | 10/2005 | Sugimoto | 348/333.12 |
| 2008/0187185 A1* | 8/2008 | Misawa et al. | 382/118 |
| 2009/0028394 A1* | 1/2009 | Hosoi et al. | 382/118 |
| 2009/0060290 A1* | 3/2009 | Sabe et al. | 382/118 |
| 2009/0141981 A1* | 6/2009 | Chan | 382/190 |
| 2010/0054705 A1* | 3/2010 | Okamoto et al. | 386/95 |

(Continued)

FOREIGN PATENT DOCUMENTS

JP    2004-56415 A    2/2004

(Continued)

OTHER PUBLICATIONS

Japanese Office Action with English translation dated Mar. 23, 2011, for Application No. 2007-025837.

*Primary Examiner* — Jason M Repko
*Assistant Examiner* — Mia M. Thomas
(74) *Attorney, Agent, or Firm* — Birch, Stewart, Kolasch & Birch, LLP

(57) ABSTRACT

A digital still camera includes a CCD image sensor for photographing an object image by photoelectric conversion, to obtain image data. A face detector determines a face feature value of a human face at an object image by image recognition according to the image data, and detects the face. A stability checker monitors the face feature value, and outputs stable result information when the face feature value is within a prescribed range consecutively for time of a predetermined length or consecutively for a predetermined number of times. A controller automatically starts image pickup of the CCD image sensor when the stable result information is output by the first stability checker.

14 Claims, 14 Drawing Sheets

U.S. PATENT DOCUMENTS

2010/0073518 A1 * 3/2010 Yeh .................... 348/231.99

FOREIGN PATENT DOCUMENTS

| JP | 2004-135029 A | 4/2004 |
| JP | 2004-294498 A | 10/2004 |
| JP | 2004-320287 A | 11/2004 |
| JP | 2005-45600 A | 2/2005 |
| JP | 2005-45601 A | 2/2005 |
| JP | 2005-284203 A | 10/2005 |
| JP | 2005-286940 A | 10/2005 |
| JP | 2006-5662 A | 1/2006 |
| JP | 2006-254358 A | 9/2006 |

* cited by examiner

IMAGE PICKUP APPARATUS HAVING STABILITY CHECKER FOR SPECIFIC OBJECT FEATURE VALUE, AND PROGRAM AND METHOD FOR CONTROL OF IMAGE PICKUP INCLUDING CHECKING STABILITY OF SPECIFIC OBJECT FEATURE VALUE

BACKGROUND OF THE INVENTION

1. Field of the Invention

The present invention relates to an image pickup apparatus, and a device and method for control of image pickup. More particularly, the present invention relates to an image pickup apparatus, and a device and method for control of image pickup, in which an object can be photographed in an optimized condition to obtain an image of high quality easily without need of high skill of a user.

2. Description Related to the Prior Art

A digital still camera is known as an apparatus in which an object image is picked up by photoelectric conversion to record image data of the object image. Various functions are carried out in the digital still camera to pick up an image in an optimized condition.

U.S. Pat. Pub. 2005/219395 (corresponding to JP-A 2005-286940) has a construction of detecting a face of a person according to image data. When a face is detected, a frame for the face detection is indicated with a live image of the person. A portion of the image associated with the detection region is evaluated to carry out AF control (autofocus control) and AE control (auto exposure control). It is possible to photograph an image in an optimized focus and exposure even in a scene where the AF control and AE control are very difficult to utilize.

JP-A 2005-284203 discloses a digital still camera in which a focus lens is moved to pick up an image. A face is detected according to image data of respective lens positions. A face feature value of the face is also determined, for image pickup by setting the focus lens in a position where the face feature value is maximized.

JP-A 2004-135029 and 2005-045600 disclose a digital still camera in which plural image data of different focus positions are obtained by focus bracket photography. One of the image data with a highest focus evaluation value is automatically selected, and stored as a recorded image.

JP-A 2005-045601 discloses a digital still camera in which a portion of a person is extracted before image pickup. A detected state of the person is evaluated according to an evaluation method while the portion of the person is analyzed. If the detected state is found low, then the person is photographed in a consecutive manner.

In U.S. Pat. Pub. 2005/219395 (corresponding to JP-A 2005-286940) and JP-A 2005-284203, image data can be recorded in an optimized condition for an object. In JP-A 2004-135029 and 2005-045600, automatic selection among plural image data is carried out in view of good focusing, so image data of a good condition can be recorded. However, the state of an object changes always with time. To photograph an object according to intention of a user depends upon skill of the user. Furthermore, in the digital still camera of JP-A 2005-045601, there remains a problem in that no image of a good condition may be obtained according to an interval or number of times of image pickup even in the consecutive image pickup.

SUMMARY OF THE INVENTION

In view of the foregoing problems, an object of the present invention is to provide an image pickup apparatus, and a device and method for control of image pickup, in which an object can be photographed in an optimized condition to obtain an image of high quality easily without need of high skill of a user.

In order to achieve the above and other objects and advantages of this invention, an image pickup apparatus includes an image pickup unit for photographing an object image, to obtain image data. An object detector determines a specific object feature value characteristically associated with a specific object according to the image data prior to image recording, to detect presence of the specific object at the object image. A first stability checker monitors the specific object feature value, and outputs stable result information when the specific object feature value is within a prescribed range consecutively for time of a predetermined length or consecutively for a predetermined number of times. A controller automatically starts image pickup of the image pickup unit for image recording when the stable result information is output by the first stability checker.

Preferably, the specific object is a human face.

Furthermore, a release switch is shiftable in a halfway depressed state and a fully depressed state. The controller, when the release switch is in the halfway depressed state, causes the first stability checker to start detection of the specific object feature value, and when the release switch is in the fully depressed state, starts the image pickup in response to the stable result information.

Furthermore, a condition input unit sets one of time of the predetermined length and the predetermined number of times, and the prescribed range.

Furthermore, a value selector designates a selected one of specific object feature values of plural specific objects if the object detector detects the plural specific objects at the object image. The first stability checker checks according to the selected specific object feature value designated by the value selector.

Furthermore, a priority input unit sets priority according to which one of a plurality of the specific object feature value is selected.

Furthermore, a result selector selects a first specific object among plural specific objects if the object detector detects the plural specific objects at the object image. When the stable result information is output for the first specific object, the controller controls a start of the image pickup.

Furthermore, a logical product circuit generates a logical product of plural outputs of the first stability checker if the object detector detects plural specific objects at the object image. When a status of the logical product is that the stable result information exists for any of the specific objects, the controller controls a start of the image pickup.

Furthermore, a weighting unit multiplies specific object feature values by weighting factors and for obtaining a weighted feature value by adding up if the object detector detects plural specific objects at the object image. The first stability checker checks according to the weighted feature value obtained by the weighting unit.

Furthermore, a focus evaluator detects a focus evaluation value of a focused state according to the image data. A second stability checker checks whether the focus evaluation value becomes within a prescribed range consecutively for time of a predetermined length or consecutively for a predetermined number of times. The controller controls a start of the image pickup according to results of check of the first and second stability checkers.

Furthermore, a motion detector detects a motion characteristic value of motion of an object in the object image according to the image data. A second stability checker checks whether the motion characteristic value becomes within a prescribed range consecutively for time of a predetermined length or consecutively for a predetermined number of times. The controller controls a start of the image pickup according to results of check of the first and second stability checkers.

Furthermore, a brightness detector detects a brightness characteristic value of brightness of an object according to the image data. A second stability checker checks whether the brightness characteristic value becomes within a prescribed range consecutively for time of a predetermined length or consecutively for a predetermined number of times. The controller controls a start of the image pickup according to results of check of the first and second stability checkers.

Furthermore, a color balance detector detects a color feature value of color of an object according to the image data. A second stability checker checks whether the color feature value becomes within a prescribed range consecutively for time of a predetermined length or consecutively for a predetermined number of times. The controller controls a start of the image pickup according to results of check of the first and second stability checkers.

Furthermore, a mode selector sets a selected one of a normal starting mode and an automatic starting mode, wherein when the normal starting mode is set, the image pickup is started upon an input of instruction of the image pickup, and when the automatic starting mode is set, the image pickup is automatically started in response to the stable result information.

After start of the image pickup, The controller discontinues or interrupts the image pickup when the specific object feature value becomes outside a prescribed range consecutively for time of the predetermined length or consecutively for the predetermined number of times.

The object detector detects a face of a person with a selected one of predetermined visual attributes, and the visual attributes are at least one of a male or female status, age group, facial expression, country zone, world regional area, and skin color of the person.

Also, an image pickup control device includes an object detector for determining a specific object feature value of a specific object at an object image according to image data obtained by an image pickup unit for photographing the object image by photoelectric conversion, to detect the specific object. A first stability checker monitors the specific object feature value, and for outputting stable result information when the specific object feature value is within a prescribed range consecutively for time of a predetermined length or consecutively for a predetermined number of times. A controller automatically starts image pickup of the image pickup unit when the stable result information is output by the first stability checker.

In a preferred embodiment, an image pickup control method is provided, and includes determining a specific object feature value of a specific object at an object image according to image data obtained by an image pickup unit for photographing the object image by photoelectric conversion, to detect the specific object. The specific object feature value is monitored, for outputting stable result information when the specific object feature value is within a prescribed range consecutively for time of a predetermined length or consecutively for a predetermined number of times. Image pickup of the image pickup unit is automatically started when the stable result information is output.

Consequently, an object can be photographed in an optimized condition to obtain an image of high quality easily without need of high skill of a user, because the specific object feature value is evaluated to output stable result information selectively in relation to the specific object.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
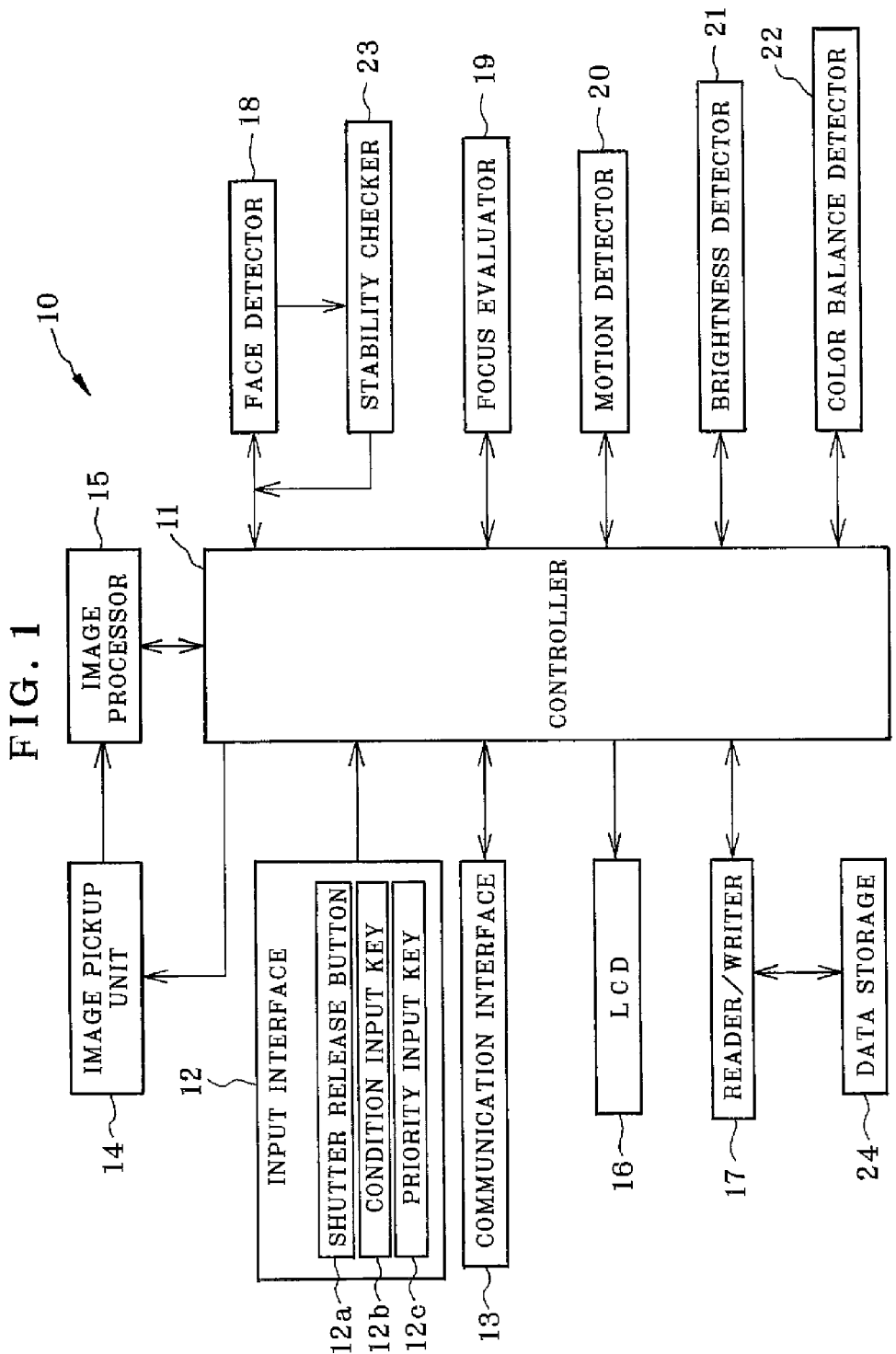
FIG. 1 is a block diagram schematically illustrating a digital still camera.

In FIG. 1, a digital still camera 10 as image pickup apparatus is illustrated. The digital still camera 10 includes a system controller 11, an input interface 12, a communication interface 13, an image pickup unit 14, an image processor 15, a display panel 16, a reader/writer 17, a face detector or object detector 18, a focus evaluator 19, a motion detector 20, a brightness detector 21 or luminance detector, a color balance detector 22 or chrominance detector, and a first stability checker 23. An image pickup control device of the invention is constituted by the face detector 18, the stability checker 23 and the controller 11.

The controller 11 controls various circuit elements in the digital still camera 10. The input interface 12 is a button panel having a number of buttons operable by a user. The input interface 12 outputs an operation signal to the controller 11 when operated. Responsive to the operation signal, the controller 11 performs tasks and drives the circuit elements.

The input interface 12 includes a shutter release button 12a, a condition input key 12b and a priority input key 12c as input unit. The shutter release button 12a includes switches S1 and S2. The switch S1 is turned on when depressed halfway. The switch S2 is turned on when depressed fully. The controller 11, when an on signal is received from the switch S1, carries out AF control, AE control and others prior to image pickup, and also starts the stability evaluation control which will be described later. When an on signal is received from the switch S2, the controller 11 controls various elements to photograph an image. The condition input key 12b is operated manually by a user, to input parameters for use in the stability evaluation, namely a length of time, number of times of image pickup, and prescribed range of change.

The communication interface 13 is used with a connection cable such as a USB cable, and communicates with a personal computer or other peripheral instruments. Any known system can be used for communication of the communication interface 13, for example, infrared communication, wireless LAN (local area network) communication, and other wireless communication. Communication protocol can be selected when required. The communication interface 13 transmits information to external devices, and also receives information from external devices. If an operation signal is received by the controller 11 through the communication interface 13 upon reception from an external device, the controller 11 performs tasks for operation signals by control of the circuit elements.

The image pickup unit 14 is an element of a camera unit including a lens system, aperture stop mechanism, and the like. An example of the image pickup unit 14 has a CCD image sensor, CMOS image sensor or other solid state image pickup element. When object light is incident on the image pickup unit 14, the object light passed through the lens system and the aperture stop mechanism is received on a reception surface of the image pickup unit 14. The image pickup unit 14 converts object image into image data photoelectrically. It is possible if required to incorporate a flash device, an illuminator or the like in the camera unit for emitting auxiliary light at the time of a small light amount.

The image processor 15 is supplied with image data output by the image pickup unit 14, and processes the image data according to noise elimination, amplification and digital conversion. Then the image processor 15 processes the image data for image processing. Examples of the image processing are offset correction, white balance processing, color matrix processing, halftone conversion, demosaic processing, edge enhancement and the like. The image processor 15 sends the processed image data to the controller 11. Also, the image processor 15 can operate for compressing and decompressing image data.

The image processor 15 operates according to a selected form of output image data desired by a user, image pickup modes, and the like, and processes the image data by image processing of various types. Also, the image processor 15 outputs image data to the face detector 18, the focus evaluator 19, the motion detector 20, the brightness detector 21 and the color balance detector 22 if required.

The image pickup modes include the still image pickup mode, the motion image pickup mode and the like. Each of the still image pickup mode and the motion image pickup mode has plural modes. For example, the plural modes are the normal starting mode and the automatic starting mode. The modes are changed over when a user operates the input interface 12 according to his or her preference. The automatic starting mode is a mode to start detection of a face feature value according to the image data obtained by the image pickup unit 14 when the shutter release button 12a is depressed halfway. When the shutter release button 12a is depressed fully, it is checked whether the face feature value is within a prescribed range consecutively for time of a predetermined length (or consecutively at times of a predetermined number of image pickup), to start the image pickup.

Before operation of the shutter release button 12a, a live image is displayed. For this time, image data of lower definition than image data of the main image pickup is input to the image processor 15 successively at a predetermined interval. The image processor 15 processes the image data by image processing of various types, and sends the processed image data to the controller 11. The display panel 16 is an LCD or a liquid crystal display panel. The controller 11 drives the display panel 16 according to the image data, to display the live image.

When the shutter release button 12a is depressed fully, image data of high definition is input to the image processor 15 for main image pickup. The image processor 15 processes image data by compression and various steps of image processing, and outputs the processed image data to the controller 11. Data storage 24 as recording medium stores image data when the reader/writer 17 is controlled by the controller 11 to write the image data. In the image recording, auxiliary information may be added to image data and recorded, for example sound data, date information of the image pickup, condition information of the image pickup, and other attribute information. Examples of the data storage 24 include an internal memory, and external memory such as a memory card removably loaded in the digital still camera 10, and also a combination of an internal memory and external memory for storing equal images at the same time.

In the playback mode, the controller 11 controls the reader/writer 17 to read image data, and controls the image processor 15 to compress or decompress image data. Then the display panel 16 is caused by the controller 11 to display an image by playback. In the playback mode, it is possible to transmit image data through the communication interface 13 to an external apparatus without display on the display panel 16. A display panel of the external apparatus can display an image.

The face detector 18 operates when the shutter release button 12a is depressed halfway, and detects a human face as a specific object in an image according to image data of the image. The face detector 18 is supplied with processed image data after image processing of various steps, and recognizes features points of eyes, nose, mouth and the like in a face in the pattern recognition. A face feature value of a face as a specific object feature value is acquired to represent characteristics of the face. If the face feature value is equal to or more than a reference face feature value, a face is found to exist. In short, the feature value is used to represent characteristics of a face. Various methods of face detection can be used, including a feature point vector approximation method in which the plural feature points are converted into vectors, and feature point vectors are detected by approximation to detect a face, a face detection method of detection of an edge or pattern detection of a form, a facial region detection method according to color tone detection or flesh color detection, and other methods. Examples of available methods are disclosed in U.S. Pat. Pub. 2005/219395 (corresponding to JP-A 2005-286940).

The face detector 18, upon detecting a human face, outputs a face feature value to the stability checker 23. Also, the face detector 18 may output information of a facial region to the controller 11, for example information of a frame line around a face. The information is used for recording or playing back an image. For example, a frame line is displayed together with a facial region of an object during the display of a live image, so as to indicate a status of detecting the face of a person as object.

Figure 2:
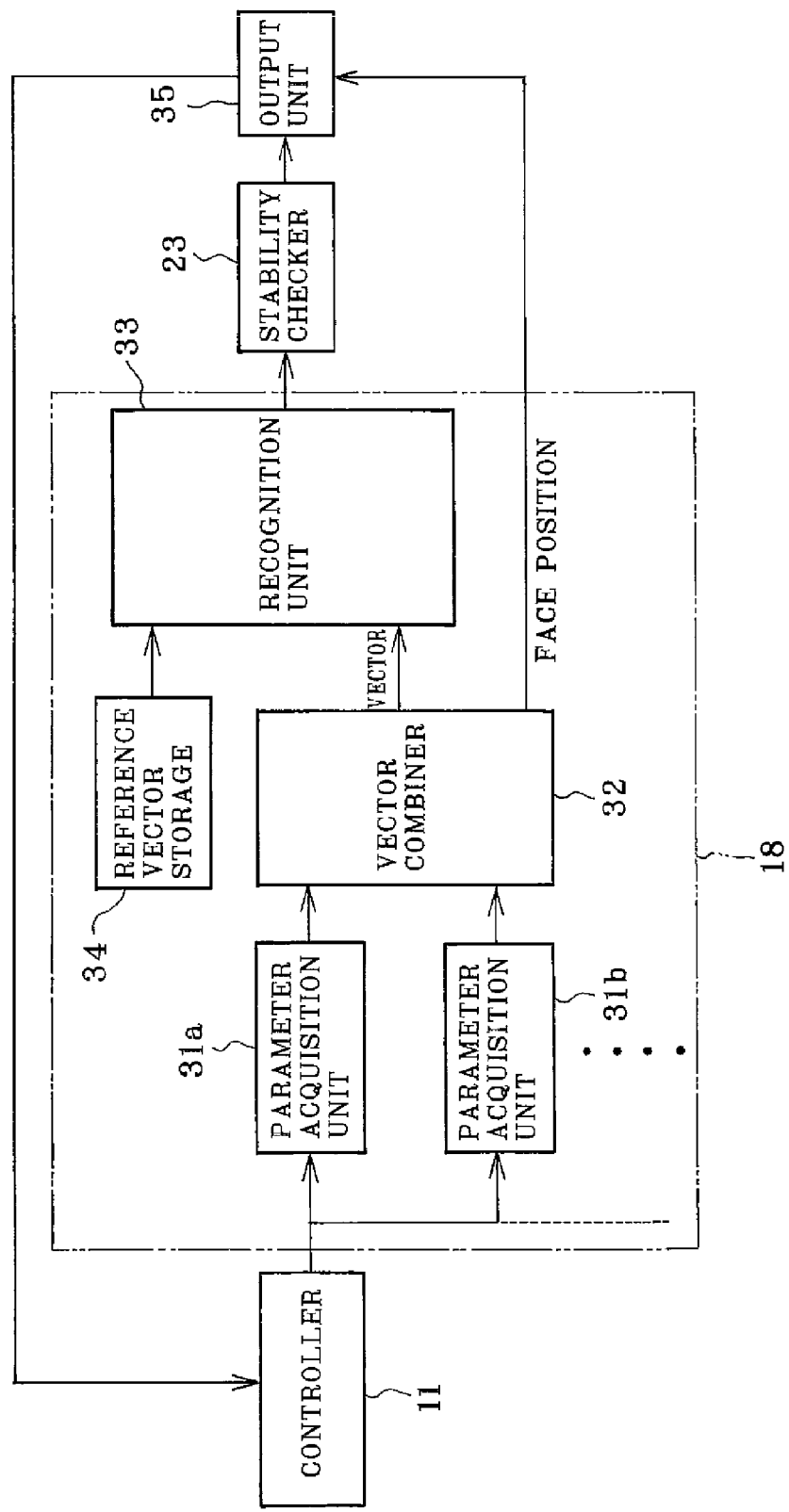
FIG. 2 is a block diagram schematically illustrating a face detector in the digital still camera.

In FIG. 2, circuit elements in the face detector 18 are illustrated for use in the feature point vector approximation method. The face detector 18 includes parameter acquisition units 31a and 31b, a vector combiner 32, a recognition unit 33, and a reference vector storage 34 or dictionary.

When image data is input by the controller 11 to the face detector 18, different parameters are detected by the parameter acquisition units 31a and 31b of which the detection positions are shifted. Note that the number of the parameter acquisition units 31a and 31b is as great as the parameters to be detected, although two of those are depicted in the drawing for simplicity. Also, a parameter acquisition unit may be a program executable type, and then may be a single unit.

The vector combiner 32 creates a vector by combining parameters. If eight parameters are input, a vector of eight dimensions is created. The recognition unit 33 compares the created vector with a reference vector stored in the reference vector storage 34 or dictionary, and obtains a face feature value or specific object feature value. If the face feature value is evaluated and equal to or more than reference face feature value, then the recognition unit 33 determines presence of a face. If the face is detected, the face detector 18 sends a face feature value to the stability checker 23. Note that a plurality of reference vectors are preferably used for various features of human faces. For use of the plural reference vectors, a highest one of face feature values obtained according to those should be preferably used for the succeeding evaluation.

The stability checker 23 obtains the face feature value successively, and checks whether the face feature value is within a prescribed range consecutively for time of a predetermined length (or consecutively at times of a predetermined number of image pickup). If it is, then stable result information is generated by the stability checker 23, and sent to an output unit 35. The predetermined length of time, the predetermined number of times, and parameters for stability evaluation are changeable by manual operation of the condition input key 12b. The stability checker 23 carries out the detection according to any parameters set by a user.

The face detector 18 sends information of a face position to the output unit 35. The output unit 35 transmits the output of the stability evaluation and the face position to the controller 11. The controller 11 controls the start of image pickup according to the output of the stability evaluation. The controller 11 checks whether the face feature value is in a prescribed range consecutively for the period of the predetermined length (or at times of the predetermined number), and if it is, controls the image pickup unit 14 and other blocks to start main image pickup.

The face detection result (face feature value) described above is used in the AF control, AE control, AWB control and the like. The AWB control is automatic adjustment of color. Also, the face detection result may be used for correcting the AF control, AE control and AWB control. It is possible that the controller 11 controls the reader/writer 17 to record the face detection result to the data storage 24 together with image data.

When the shutter release button 12a is depressed halfway, the focus evaluator 19 obtains a focus evaluation value according to image data received from the image pickup unit 14 for focus evaluation of the object. A specific example of focus evaluation includes splitting into blocks, filtering, and integrating. At first, the image data is split into the plural blocks. Image data are filtered according to each of the blocks. For the filtering, it is possible to use a low pass filter, band pass filter and the like according to characteristics of the optical system. The focus evaluator 19 integrates the image data of the respective blocks after the filtering, to acquire the focus evaluation value for the blocks. Note that other examples of focus evaluation may be used, such as a method of detection of contrast. A result of the focus evaluation is used in the AF control.

The motion detector 20 evaluates image data from the image pickup unit 14, and obtains a motion characteristic value to determine motion of an object. Specifically, feature points are extracted from image data. A motion vector is created, which is information of changing positions of the extracted feature points within an image with time. Note that other methods may be used for detecting motion. For example, information of a difference between images with time is obtained. A change in the contrast of the difference information is detected as motion. A result of detection of the motion detector 20 can be used to raise the precision of the AWB, but also can be used to raise the precision of the face detector 18.

In response to halfway depression of the shutter release button 12a, the brightness detector 21 detects a brightness characteristic value associated with object brightness according to the image data obtained by the image pickup unit 14. A specific method of brightness detection includes splitting of image data into data of plural blocks, and integrating brightness data of the blocks so as to obtain brightness characteristic values of the blocks. Note that, if the brightness characteristic value of the entirety of the image is required, this can be obtained by weighting operation which includes multiplying the brightness characteristic values by weighting factors and adding up the products. The detection result of the brightness detector 21 can be used in the AE control, and also in the AF control, AWB control and a control of raising precision of the face detection.

When the shutter release button 12a is depressed halfway, the color balance detector 22 detects a color feature value representing the color of the object according to image data obtained by the image pickup unit 14. A specific method of detecting the color feature value is a process in that R, G and B components of image data of the image are integrated for the colors, and the integrated values are used as color feature value. Alternatively, a ratio R/G of the red component to the green component, and a ratio B/G of the blue component to the green component may be used as color feature value. Furthermore, an image may be split into plural blocks in a manner similar to the brightness detector 21, and color feature values of the blocks may be determined. Note that the detection result of the color balance detector 22 is used for the AWB control and for raising precision of the face detector.

In the digital still camera 10, an image is picked up when the shutter release button 12a is depressed fully by a user. If the shutter release button 12a is kept depressed (turned on) in a continuous manner, still images are consecutively taken to record a sequence of images. If the shutter release button 12a is returned abruptly, only one image is recorded as a single exposure. In an image pickup mode of motion picture, the shutter release button 12a is depressed fully to start image pickup of the motion picture. When the shutter release button 12a is depressed fully for a second time, the image pickup of the motion picture is stopped.

Figure 3:
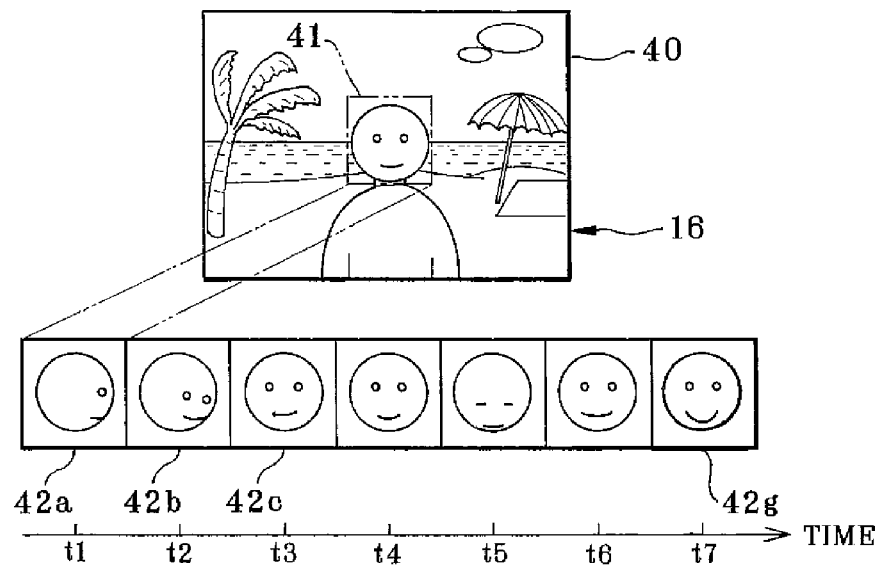
FIG. 3 is an explanatory view in graph illustrating a sequence of changes of a face in an object image with time.
Figure 4:
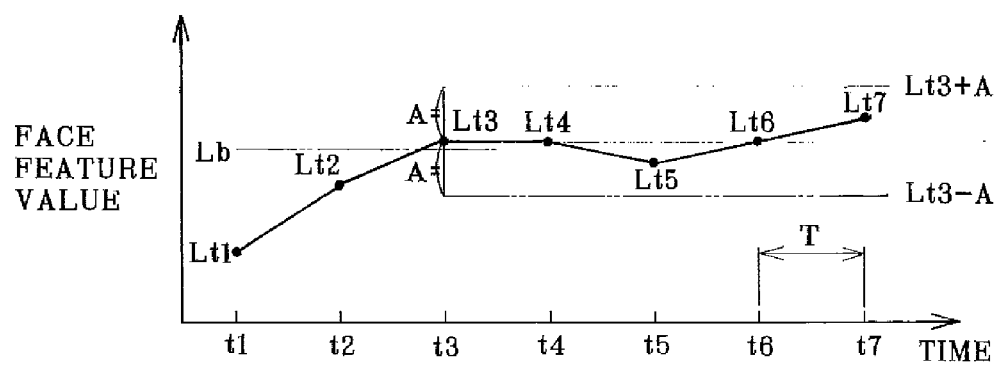
FIG. 4 is a graph illustrating changes in the face feature value.
Figure 5:
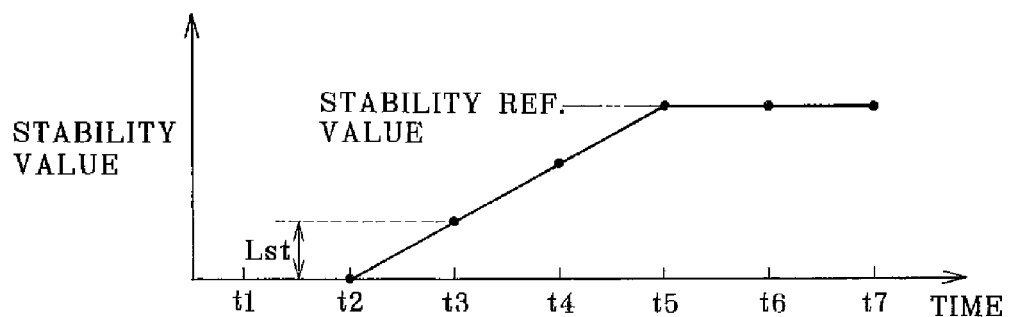
FIG. 5 is a graph illustrating a stability value.

FIGS. 3-5 are referred to now to describe the face detector 18 and the stability checker 23. When image data obtained by the image pickup unit 14 is input to the face detector 18, the face detector 18 acquires a face feature value and face position according to the image data.

In FIG. 3, a frame 41 is displayed with an object image 40 on the display panel 16 for the above described detection result. A person always moves as an object of image pickup, to change a position of a face, direction and appearance with time. FIG. 3 illustrates examples of such changes at times t1-t7. The following is description of detection of stability of the direction of the face to start image pickup according to the detection result. It is also possible to monitor motion of an object, for example closing of eyes of a person, and to start the image pickup when a state without closing of eyes continues for a predetermined time. The number of persons may be two or more. If a group photograph is intended for three persons, it is possible to pick up an image by preventing of closing of eyes of the three according to the invention.

In FIG. 4, the face feature value from the face detector 18 changes with time from t1 to t7. In the graph, time is taken on the horizontal axis. The face feature value is taken on the vertical axis. As viewed in the graph, image data is intermittently output by the image pickup unit 14. A face feature value as face detection result is also intermittently output. Amounts of the face feature value are discrete.

The graph is formed by connection of discrete face feature values Lt1-Lt7 with straight lines. A MOS type of image sensor with plural channels for output can be preferably used. It is possible to obtain an image intermittently in a first channel, and to output a certain portion of an image in a second channel at a smaller interval of time. The detection is possible more consecutively by use of such results.

As is observed from the graph, the face feature value is as low as Lt1 when the face of the person is directed laterally. The face feature value increases from Lt1 when the face is directed gradually to the front. When the face feature value rises and becomes equal to Lt3 which is equal to or more than a reference face feature value Lb, then the recognition unit 33 detects the presence of a face.

The stability checker 23 checks stability of the face feature value with reference to the reference face feature value Lt3 acquired when the recognition unit 33 recognizes a face. For example, the stability checker 23 determines a prescribed range of Lt3−A to Lt3+A in consideration of the face feature value Lt3 and the stability tolerance A. The stability is checked as to whether the face feature value comes within the prescribed range consecutively for time of a predetermined length (or consecutively at times of a predetermined number of image pickup). If a user wishes manually to set the prescribed range, he or she inputs a value of the stability tolerance A.

For example, image data is intermittently input to the face detector 18. Let T be an interval of inputs of the image data. If the face feature value is within the range in the period of 3T, it is determined that the face feature value is equal to or more than a sufficient level, and is stable. When the face feature value is found stable, the controller 11 starts the image pickup. In the graph of the FIG. 4, the sufficient level is Lt3−A, and is lower than the reference face feature value for concluded detection of a face. This is because the reference face feature value may be lowered once there is a result of a face.

In the embodiment, the stability is checked only according to the face feature value. However, it is preferable to check stability in a combined manner. For example, a detected face position is utilized, to decrease a lower limit of the prescribed range for checking if the face position remains unchanged.

Also, it is possible to compare a lower limit Lt3−A of the prescribed range of the stability evaluation with the reference face feature value Lb, and to set a new lower limit of the prescribed range according to the greater one of those two. It is possible to utilize a very good moment for shot exactly by starting the image pickup after confirmation of stable detection of a face for a predetermined length of time.

Also, it is likely that the face feature value does not become within the prescribed range of the stability for the predetermined length of time. For this event, it is possible to end or interrupt the operation of image pickup. This is effective in reducing the number of unacceptable recorded images when images of scenes are found unacceptable. In the motion picture, playback of motion images requires time as long as time required for photographing those. Furthermore, the effect of this construction makes it possible to release the shutter only while a face of a person as principal object can be visually recognized.

In FIG. 5, a stability value is utilized in combination with the above operation. The stability value is obtained by integrating the face score value Lst at the time of becoming of the face feature value more than the reference face feature value Lb, and also for three times of the integration in view of the period of 3T. This is equivalent with counting the number of times that the face feature value becomes more than the reference face feature value Lb during the period of 3T. If the face feature value is stable for the period 3T, then the stability checker 23 determines that the face feature value is stable. Similarly, the various elements are controlled to start the image pickup when the face feature value is found stabilized. This is advantageous in utilizing a very good moment for shot because the number of times of detection of a face can be used to start the image pickup in the predetermined period.

In the above description, a constant value is added when the face feature value becomes more than the reference face feature value. However, it is possible to add the face feature value itself when the face feature-value becomes more than the reference face feature value. The detection of the face can be utilized more precisely to start the image pickup.

Figure 6:
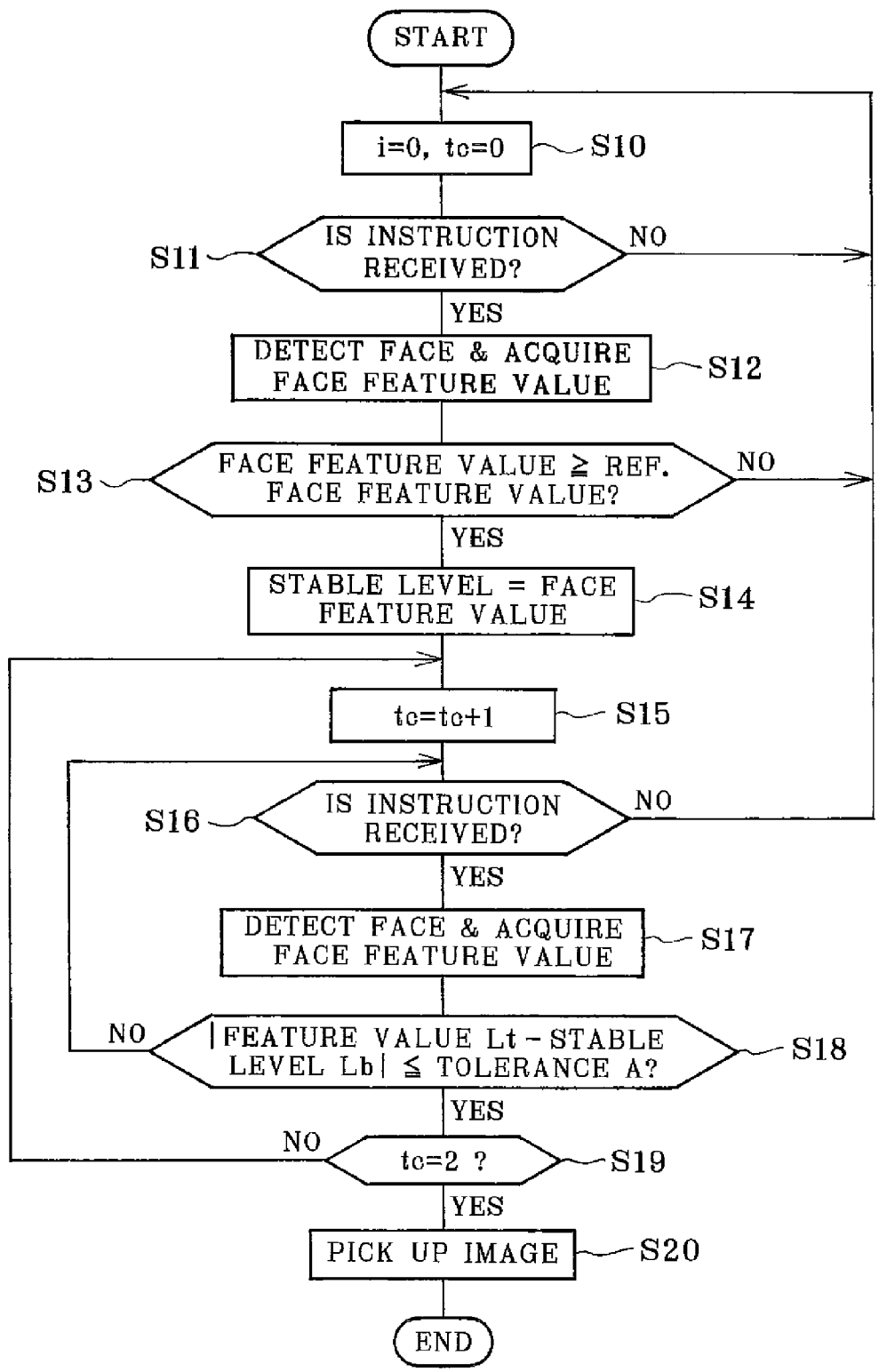
FIG. 6 is a flow chart illustrating a sequence of image pickup in which stability is evaluated by checking whether the face feature value is within a prescribed range consecutively at times of a predetermined number.

In FIG. 6, a flow of image pickup is illustrated, in which the image pickup is started when the face feature value becomes within a prescribed range after a predetermined number of times of the image pickup. Let an automatic starting mode be set by operating the input interface 12 manually. At first, the controller 11 initializes the stability checker 23, namely initializes the index number i and a counter value tc at step S10, with i=0 and tc=0.

In step S11, the controller 11 checks whether an instruction signal for start is received. To this end, the shutter release button 12a is monitored to check whether an on signal from the switch S1 is received. Note that the instruction signal may be found according to operation of a portion of the input interface 12 other than the shutter release button 12a, or external signal input by the communication interface 13.

If no instruction signal for image pickup is found received, then the operation returns to step S10 for repeating the sequence. If an instruction signal for image pickup is found received, then image data for a live image obtained by the image pickup unit 14 is processed by the image processor 15 for image processing. The face detector 18 obtains the image data, and acquires a facial region and face feature value as specific object in an object image in step S12. At the same time, the AF control, AE control and other controls prior to the image pickup are carried out.

Then in step S13, it is checked whether the face feature value from step S12 is equal to or more than the reference face feature value which is a lower limit for a face. If the face feature value is found less than the reference face feature value, then the operation returns to step S10 to repeat the sequence.

If the face feature value is found equal to or more than the reference face feature value, then the face feature value is substituted for the stable level (as reference level) at step S14. At step S15, the controller 11 adds 1 to the counter value tc (tc=tc+1). At step S16, the controller 11 checks whether an instruction signal for image pickup is input. To this end, it is checked whether an ON signal from a switch S2 is received or not. If no instruction signal for image pickup is found received, then the operation returns to step S10 for repeating the sequence.

If the instruction signal for image pickup is found received, then the face detector 18 detects a face and acquires a face feature value at step S17. Then in step S18, the stability checker 23 checks whether the face feature value obtained in step S17 is within the prescribed range according to the stable level Lt3 (as reference level) which is an initial face feature value of the face detection. Specifically, the stable level is subtracted from the face feature value. It is checked whether an absolute value of the result of the subtraction is equal to or less than the stability tolerance A. Note that the stability tolerance A may be an automatically set parameter or a parameter set manually by a user.

If an absolute value of the result of the subtraction is more than the stability tolerance A of the face evaluation, the face feature value is found outside the prescribed range. The operation returns to step S16 for repeating the sequence. If the absolute value of the result of the subtraction is equal to or less than the stability tolerance A of the face evaluation, the face feature value is found within the prescribed range. The operation proceeds to step S19.

In step S19, the stability checker 23 checks whether the counter value tc=2. If the counter value tc is found different from 2, then the operation returns to step S15 to repeat the sequence. If the counter value tc is found 2, then the operation proceeds to step S20 because the face feature value of the detected face is found to become within the prescribed range for two consecutive times. The controller 11 drives the image pickup unit 14 to take a main exposure. An image of image data obtained by the image pickup is displayed on the display panel 16. The image data is written to the data storage 24.

Note that the number of times of coming within the prescribed range may be changed, for examples two, or four or more in place of three before the start of image pickup. Although the start of the image pickup in the embodiment is based on the number of times of coming of the face feature value within the prescribed range, the start of the image pickup can be based on at least a predetermined time period of coming of the face feature value within the prescribed range. Details of the controls are similar to the above even for the alternative structure.

Also, it is possible to discontinue the image pickup if the face feature value is not within a prescribed range consecutively for the period of the predetermined length (or at times of the predetermined number). This control of start and end of the image pickup makes it possible to photograph only images of which the face feature value is sufficiently stable.

Figure 7:
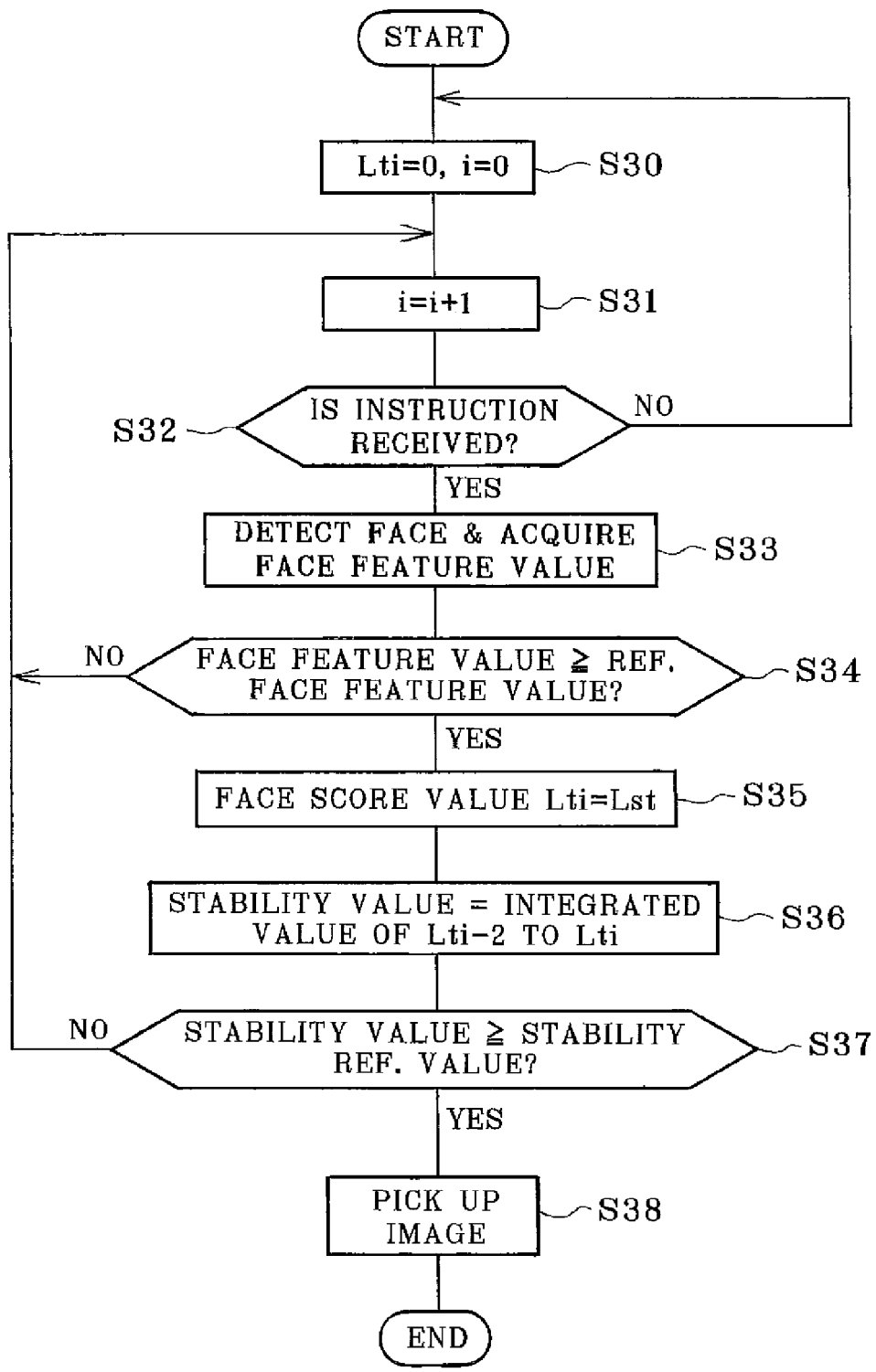
FIG. 7 is a flow chart illustrating a sequence of image pickup in which stability is evaluated according to the stability value.

In FIG. 7, a flow of image pickup is illustrated, in which image pickup is started by evaluating stability of the face feature value in use of the stability value. In the above description, the evaluation of stability is carried out when the shutter release button 12a is depressed halfway. In contrast, the present construction is herein described in which the evaluation of stability is carried out upon full depression of the shutter release button 12a.

In the automatic starting mode, the controller 11 at first initializes the face score value Lti and the index number i (Lti=0 and i=0) at step S30. In step S31, a value 1 is added to the index number i (i=i+1). In step S32, the controller 11 checks whether an instruction signal for image pickup is received. This is according to monitoring of the switch S2 at the shutter release button 12a.

If no instruction signal for image pickup is found received, the operation returns to step S30 to repeat the same sequence. If an instruction signal for image pickup is found received, then the face detector 18 receives the image data to detect a face and acquire a face feature value at step S33.

Then in step S34, it is checked whether the face feature value from the step S33 is equal to or more than the reference face feature value. If it is not, then 0 is substituted for the face score value Lti. The operation returns to the step S31 to repeat the sequence.

If the face feature value is equal to or more than the reference face feature value, then the face score standard value Lst is substituted for the face score value Lti at step S35. Also, the integrated value from Lti-2 to Lti is substituted for the stability value at step S36. In step S37, it is checked whether the stability value is equal to or more than a stability reference value.

If the stability value is found less than the stability reference value, then the operation returns to step S31 to repeat the sequence. If the stability value is found equal to or more than the stability reference value, then the operation proceeds to step S38. The controller 11 controls the various circuits to photograph an image, and then to complete the image pickup operation.

Figure 8:
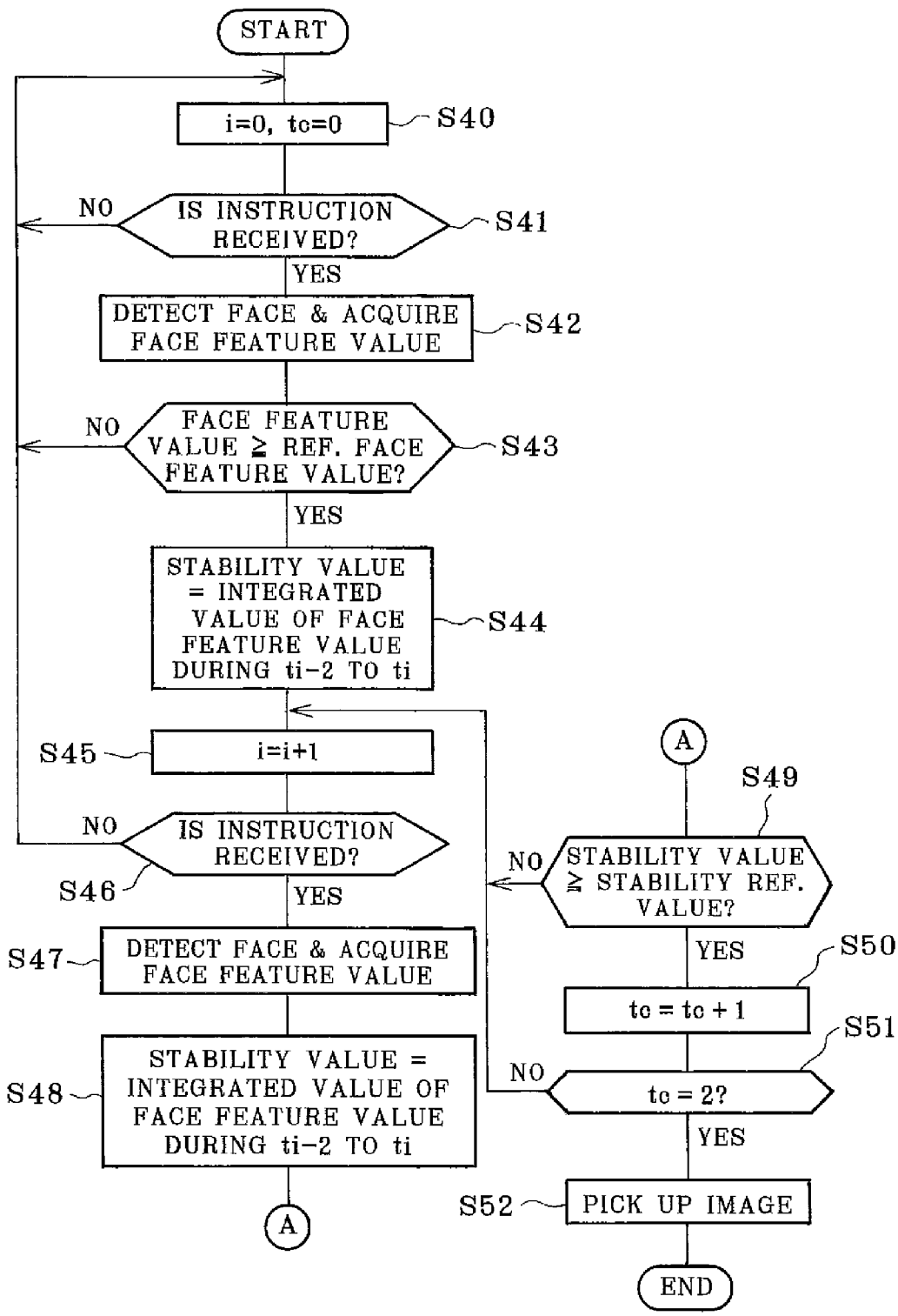
FIG. 8 is a flow chart illustrating a sequence of image pickup in which a face is detected at one time.

In FIG. 8, another preferred embodiment of an image pickup sequence is described, in which it is checked only at one time whether the face feature value is equal to or more than a reference face feature value. In the case of the automatic starting mode, the controller 11 initializes the index number i and the counter value tc at step S40, with i=0 and tc=0.

Then in step 41, the controller 11 checks whether an instruction signal for start is received. This is according to monitoring an output of the switch S1 of the shutter release button 12a. If no instruction signal is found received, then the operation returns to step S40 to repeat the sequence. If an instruction signal is found received, then the face detector 18 acquires image data, and detects a face and obtains a face feature value in step S42.

In step S43, it is checked whether the face feature value obtained in step S42 is equal to or more than the reference face feature value. If the face feature value is found less than the reference face feature value, then the operation returns to step S40 to repeat the sequence.

If the face feature value is found equal to or more than the reference face feature value, then an integrated value of the face feature value of the periods ti-2 to ti is substituted for the stability value. See step S44. In step S45, the controller 11 adds 1 to the index number i (i=i+1).

Then the controller 11 checks whether an instruction signal for image pickup is received or not at step S46. This is according to the reception of the on signal of the switch S2 from the shutter release button 12a. If no instruction signal for image pickup is found received, then the operation returns to step S40 to repeat the sequence.

If an instruction signal for image pickup is found received, then the face detector 18 detects a face and acquire a face feature value at step S47. Then an integrated value of the face feature value in the periods ti−2 to ti is substituted for the stability value. See step S48. Also, it is checked in step S49 whether the stability value is found equal to or more than the stability reference value. If the stability value is found less than the stability reference value, the operation returns to step S45 to repeat the sequence.

If the stability value is found equal to or more than the stability reference value, the controller 11 adds 1 to the counter value tc (tc=tc+1) at step S50. It is checked in step S51 whether the counter value tc is 2 or not. If the counter value tc is found unequal to 2, then the operation returns to step S45 to repeat the sequence.

If the counter value tc is found equal to 2, then the controller 11 controls the various circuits to carry out and complete the image pickup. Note that the stability value is compared with the stability reference value for two times according to step S49.

Figure 9:
FIG. 9 is a plan illustrating an object image containing faces of two persons.
Figure 10:
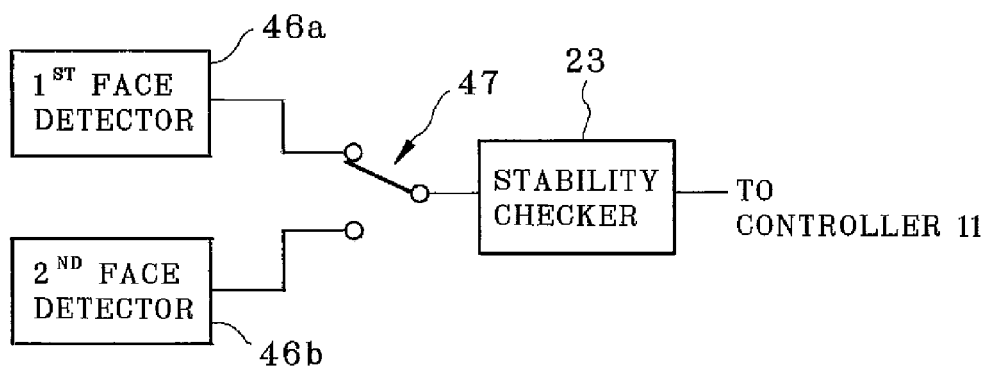
FIG. 10 is a block diagram schematically illustrating a preferred embodiment in which two face detectors are used to output face feature values selectively.

In FIG. 9, a second preferred embodiment is illustrated, in which there are two persons in an object image 45, and two faces in the object image 45 are detected. In FIG. 10, a first face detector or object detector 46a, and a second face detector or object detector 46b are used. A value selector 47 is connected between the stability checker 23 and the first and second face detectors 46a and 46b. For the first and second face detectors 46a and 46b, the construction of the face detector 18 is repeated. The first face detector 46a detects a face feature value LX. The second face detector 46b detects a face feature value LY. The face feature values LX and LY are selectively output to the stability checker 23 with the value selector 47. The control of the starting the image pickup is based on the stability of one of the face feature values. The value selector 47 selects the face feature values according to the priority condition set by the priority input key 12c.

Therefore, it is possible to change selection of one of the two faces, because those are detected simultaneously and a face feature value of either one of those is output to the stability checker 23. The faces can be selected manually by a user referring to the face feature values, or can be selected automatically. For automatic selection, reference data is preferably changeable according to preference or other conditions.

Figure 11:
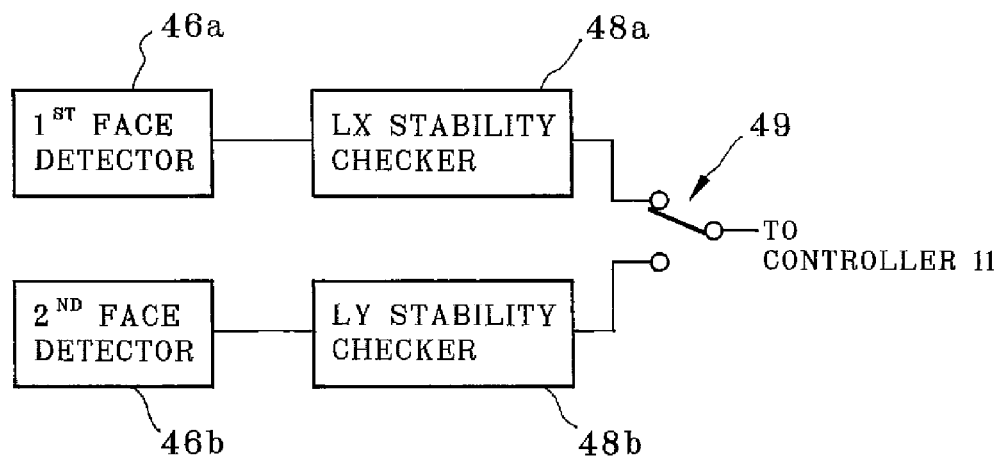
FIG. 11 is a block diagram schematically illustrating a preferred embodiment in which two stability checkers are used to generate output of stability evaluations selectively.

In FIG. 11, a preferred embodiment is illustrated, and includes an LX stability checker 48a and an LY stability checker 48b. A result selector 49 is connected with output terminals of the LX and LY stability checkers 48a and 48b. The stability checker 23 described above is repeated for each of the LX and LY stability checkers 48a and 48b. The face feature values LX and LY from the first and second face detectors 46a and 46b are input respectively to the LX and LY stability checkers 48a and 48b. The result selector 49 selects one of the outputs of the LX and LY stability checkers 48a and 48b. The controller 11 receives one of the two outputs of stability evaluation, and controls the start of image pickup according to this.

If a first one of the persons as principal object is stable and a second one of them is unstable, then the stability of the second person is checked for the purpose of control of the start of the image pickup. So an image can be photographed in a best intended manner to the user.

Figure 12:
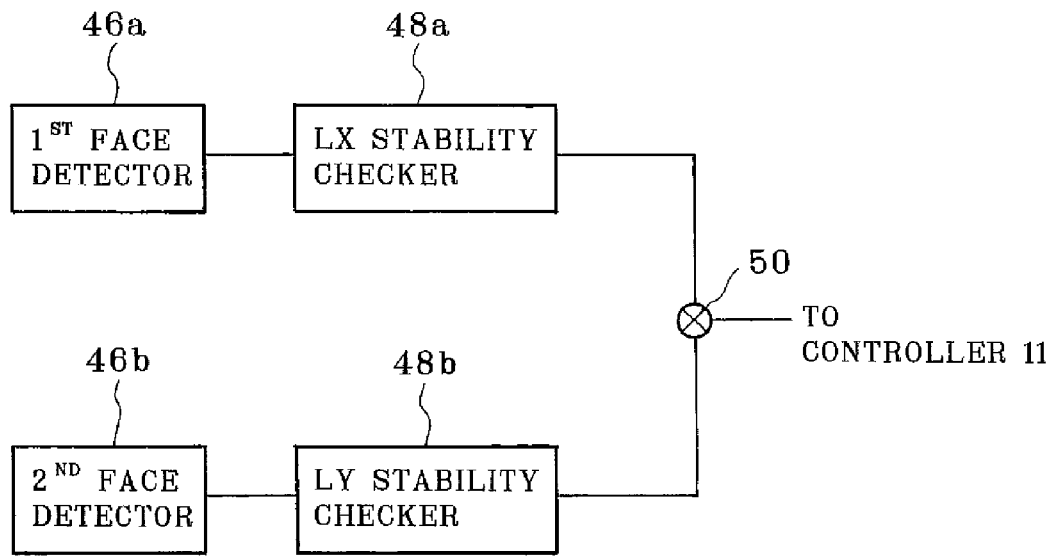
FIG. 12 is a block diagram schematically illustrating an example in which a logical product of output of stability evaluations are generated.

In FIG. 12, a preferred embodiment is illustrated, in which stability evaluation is carried out discretely for face feature values LX and LY, to control the start of image pickup according to a logical product or a result of AND between the outputs of stability evaluation. An AND circuit 50 as logical product circuit is connected in place of the result selector 49. Regions of two faces are subjected to face detection and stability evaluation separately, so that the AND circuit 50 generates a logical product of two outputs of stability evaluation. The logical product is output and sent to the controller 11.

Thus, the image pickup can be started when both faces are stable, because the logical product of the outputs of the stability evaluation is used. When two persons are targeted, both of the two can be photographed stably. Examples of two persons are two children, a parent and a children, a boy and girl and the like.

Figure 13:
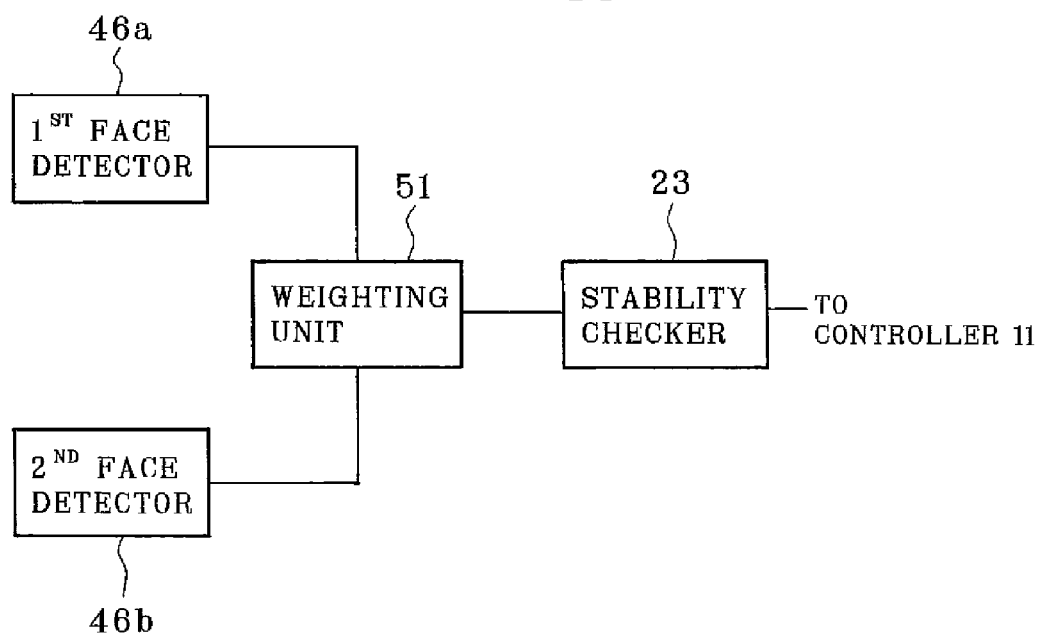
FIG. 13 is a block diagram schematically illustrating an example in which weighting is carried out for face feature values.

In FIG. 13, one preferred embodiment is illustrated, in which face feature values are weighted. A weighting unit 51 is connected between the stability checker 23 and the first and second face detectors 46a and 46b. The weighting unit 51 multiplies the face feature values LX and LY by weighting factors, and then adds up the weighted feature values. A sum obtained by the weighting unit 51 is sent to the stability checker 23.

Thus, a first one of the two persons, which a user regards as principal object, can be photographed with priority, because the weighting of the face feature values LX and LY is determined by the user operating the input interface 12. The first person can be photographed in a best condition even with the two persons.

Note that three or more faces may be detected in contrast with the above description related to FIGS. 10-13 in which two faces are detected. For three or more faces, the numbers of the first and second face detectors and the stability checkers may be determined suitably.

The first and second face detectors 46a and 46b are two blocks. The LX and LY stability checkers 48a and 48b are two blocks. However, a single block may be used for each of the face detector and stability checker. The single block can be operated in a manner of time sharing. Alternatively, partial operation may be carried out by the controller 11 in combination with the single block.

Figure 14:
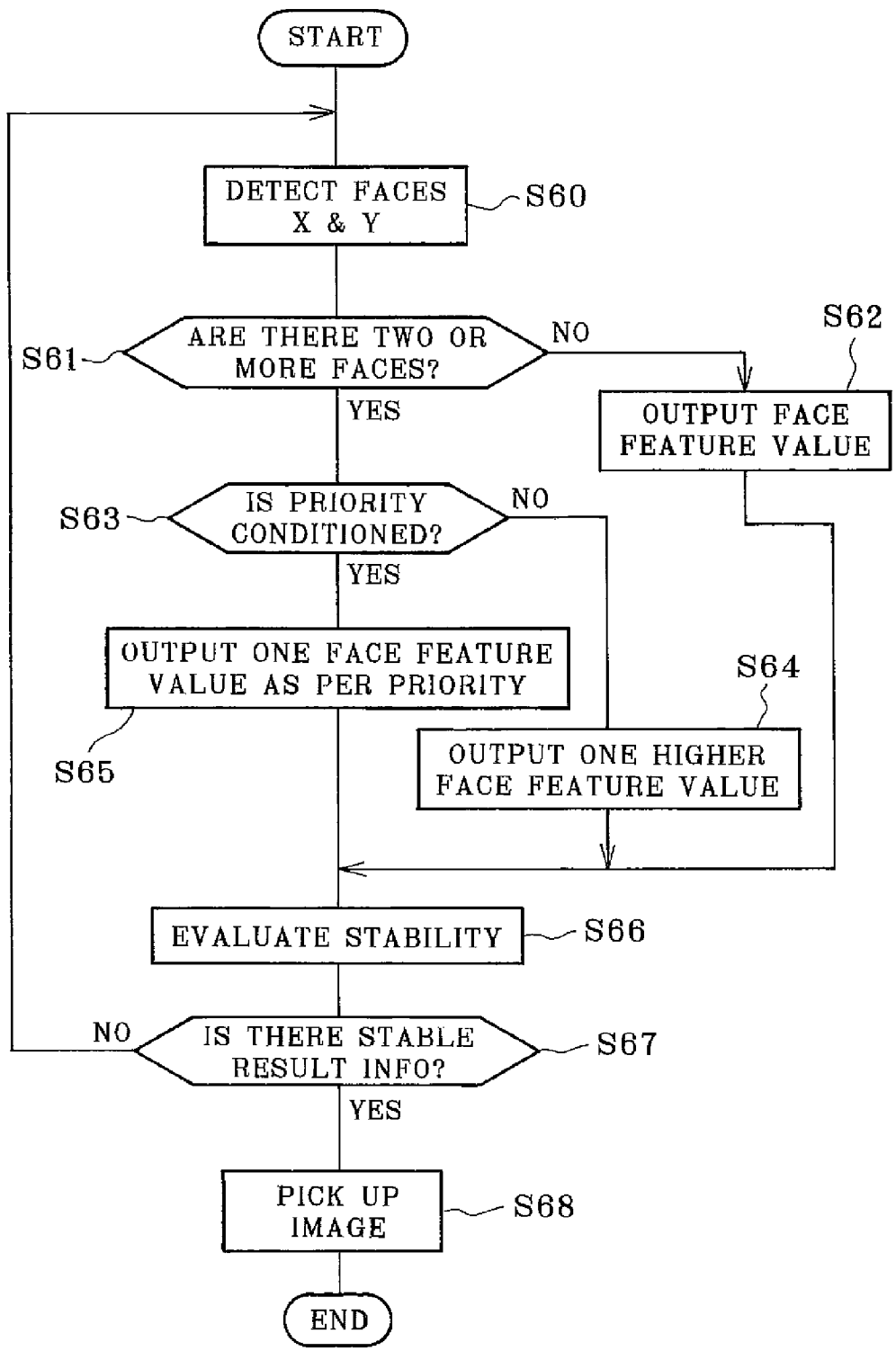
FIG. 14 is a flow chart illustrating an example in which face feature values are output selectively.

In FIG. 14, a sequence of starting the image pickup in combination with use of the first and second face detectors 46a and 46b is illustrated. Image data obtained by the image pickup unit 14 is input to the first and second face detectors 46a and 46b, which detect face feature values LX and BY. If each of the face feature values is equal to or more than the reference face feature value, then a face is detected at step S60.

In step S61, the controller 11 checks whether two or more faces are detected. If only one face is detected, then the controller 11 causes the value selector 47 in step S62 to send one face feature value to the stability checker 23. The operation proceeds to step S66.

If two or more faces are found to exist, the controller 11 at step S63 checks whether any priority condition is determined manually with the priority input key 12c.

If no priority is found determined, then the controller 11 causes the value selector 47 in step S64 to output a higher one of the face feature values to the stability checker 23. If priority is found determined, then the controller 11 causes the value selector 47 in step S65 to output one of the face feature values to the stability checker 23 according to the determined priority. Then the operation proceeds to step S66.

In step S66, the stability checker 23 checks whether the face feature value is stable consecutively for the period of the predetermined length (or at times of the predetermined number). If the face feature value is found not stable, then the operation returns to step S60 to repeat the sequence. If the face feature value is found stable, then the controller 11 controls the various elements to pick up an image at step S68. Thus, image pickup is completed.

Figure 15:
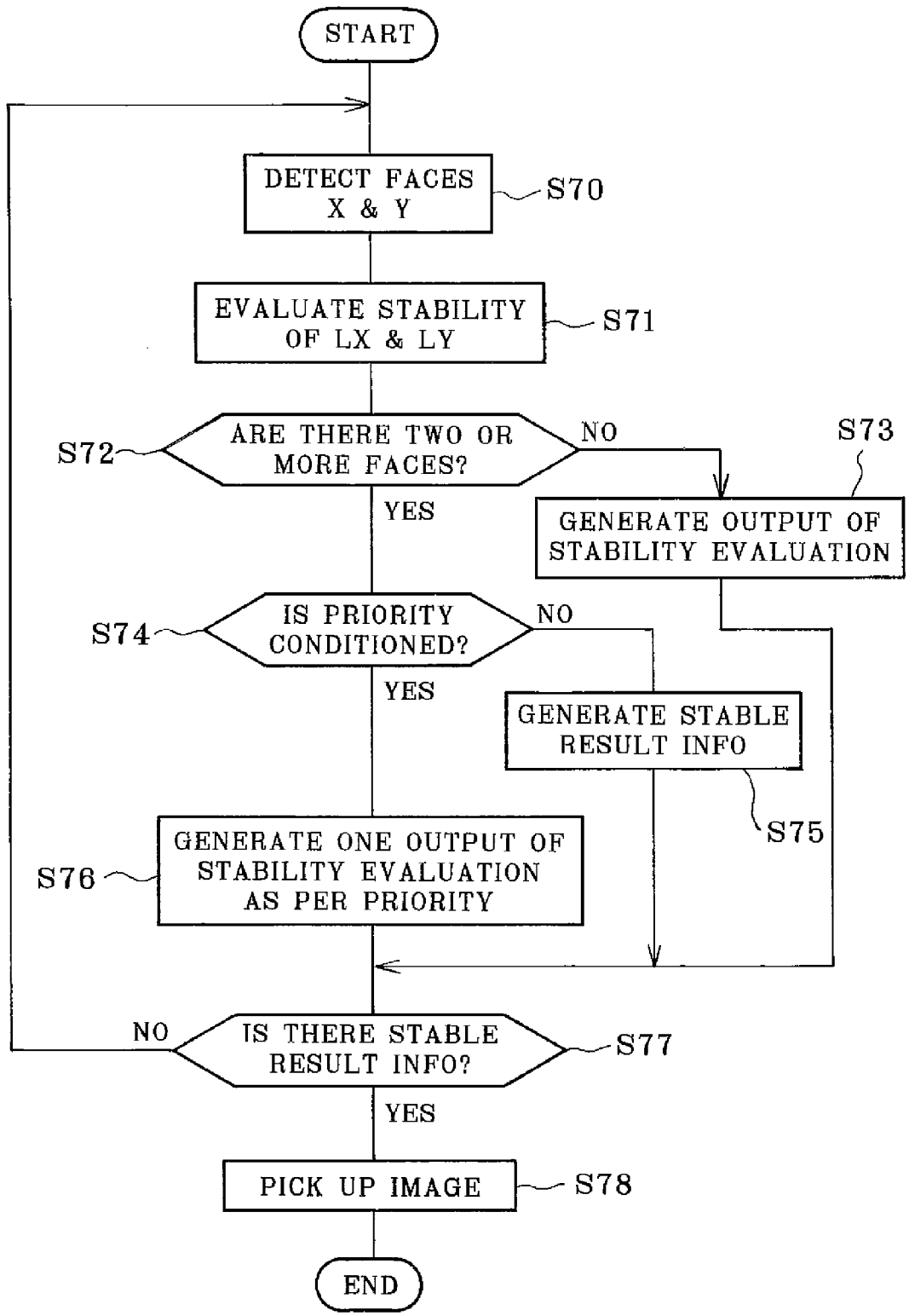
FIG. 15 is a flow chart illustrating a sequence in which an output of stability evaluation is selectively generated.

In FIG. 15, a sequence of image pickup is illustrated, in which the LX and LY stability checkers 48a and 48b are used to obtain outputs of the stability evaluation selectively.

When image data is input to the first and second face detectors 46a and 46b, the face feature values LX and LY are detected by the first and second face detectors 46a and 46b. If the face feature values are found equal to or more than the reference face feature value, then presence of faces is determined at step S70.

In step S71, the LX stability checker 48a evaluates the face feature value LX and checks stability. The LY stability checker 48b evaluates the face feature value LY and checks stability. In step S72, the controller 11 checks whether two or more faces are detected.

If the number of the face is only one, then the controller 11 at step S73 controls the result selector 49 to cause a selected one of the LX and LY stability checkers 48a and 48b to generate an output of existence or lack of stable result information. Then the operation proceeds to step S77.

If two or more faces are found, then the controller 11 checks in step S74 whether the priority as condition is determined manually by a user.

If no priority is found determined, then the controller 11 controls the result selector 49 at step S75 in order to generate an output with no stable result information from one of the LX and LY stability checkers 48a and 48b. This means low stability. Then the operation proceeds to step S77.

If priority is found determined, then the controller 11 controls the result selector 49 at step S76 in order to generate one of outputs of the stability evaluation according to the determined priority. Then the operation proceeds to step S77.

In step S77, the controller 11 checks existence or lack of stable result information, namely checks whether the evaluation result is stable or not. If no stable result information is found output, then the operation returns to step S70 to repeat the sequence. If the stable result information is found output, then the controller 11 controls the various elements to pick up an image at step S78. Thus, the image pickup is completed.

Figure 16:
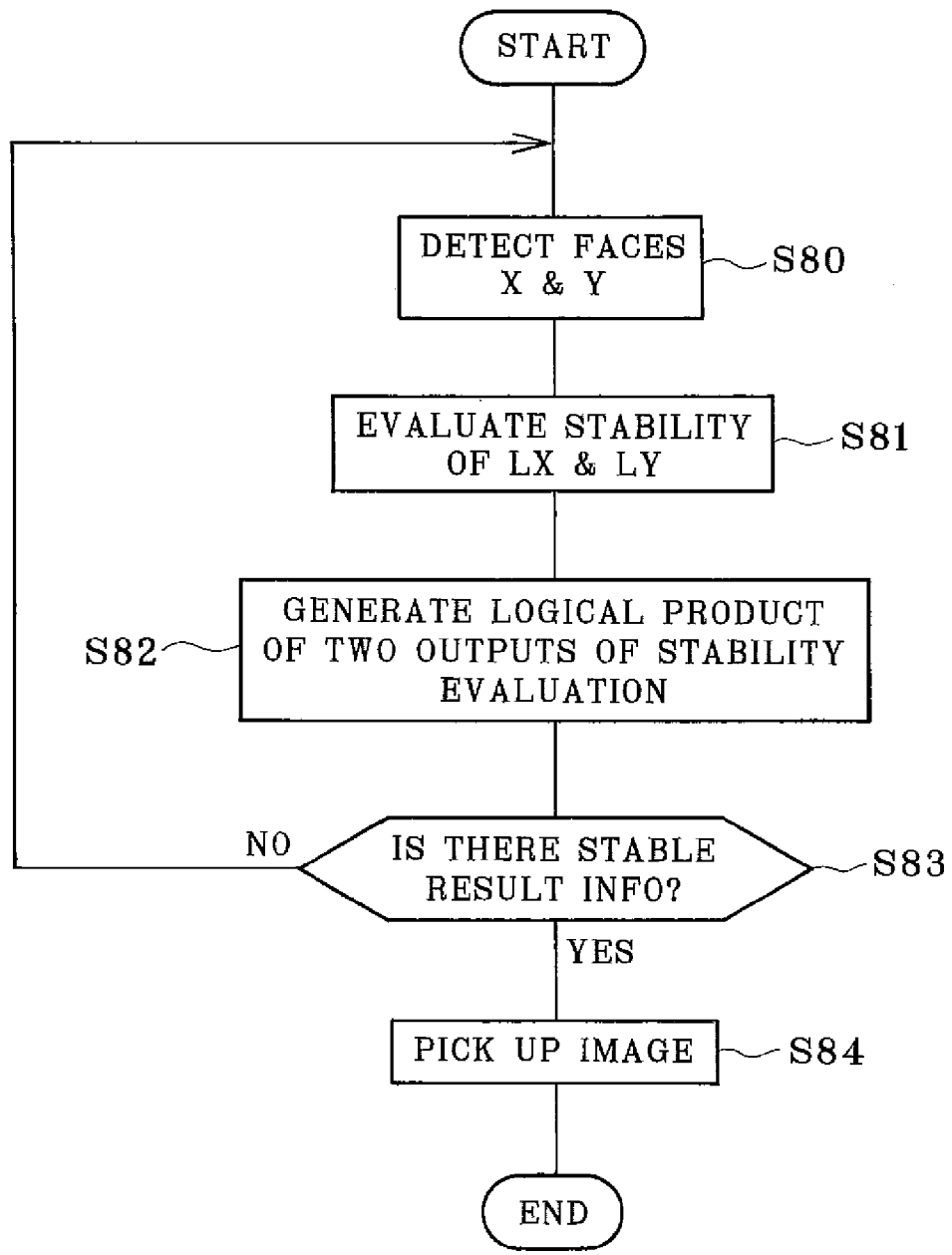
FIG. 16 is a flow chart illustrating a sequence in which a logical product of outputs of stability evaluations is generated.

In FIG. 16, a sequence is illustrated, in which stability is evaluated for each of the face feature values LX and LY discretely, and image pickup is started according to a logical product of two outputs of the stability evaluation. For steps S80 and S81, steps S70 and S71 of FIG. 15 are repeated.

In step S82, the AND circuit 50 is supplied with an output of existence or lack of stable result information from the LX and LY stability checkers 48a and 48b, and determines a logical product of the outputs of the stability evaluation. Data of the logical product is sent to the controller 11.

In step S83, the controller 11 detects existence or lack of stable result information. In case of no stable result information, then the operation returns to step S80 to repeat the same sequence. In case of existence of the stable result information, the controller 11 in step S84 controls various circuits to start image pickup. Thus, the image pickup is ended.

Figure 17:
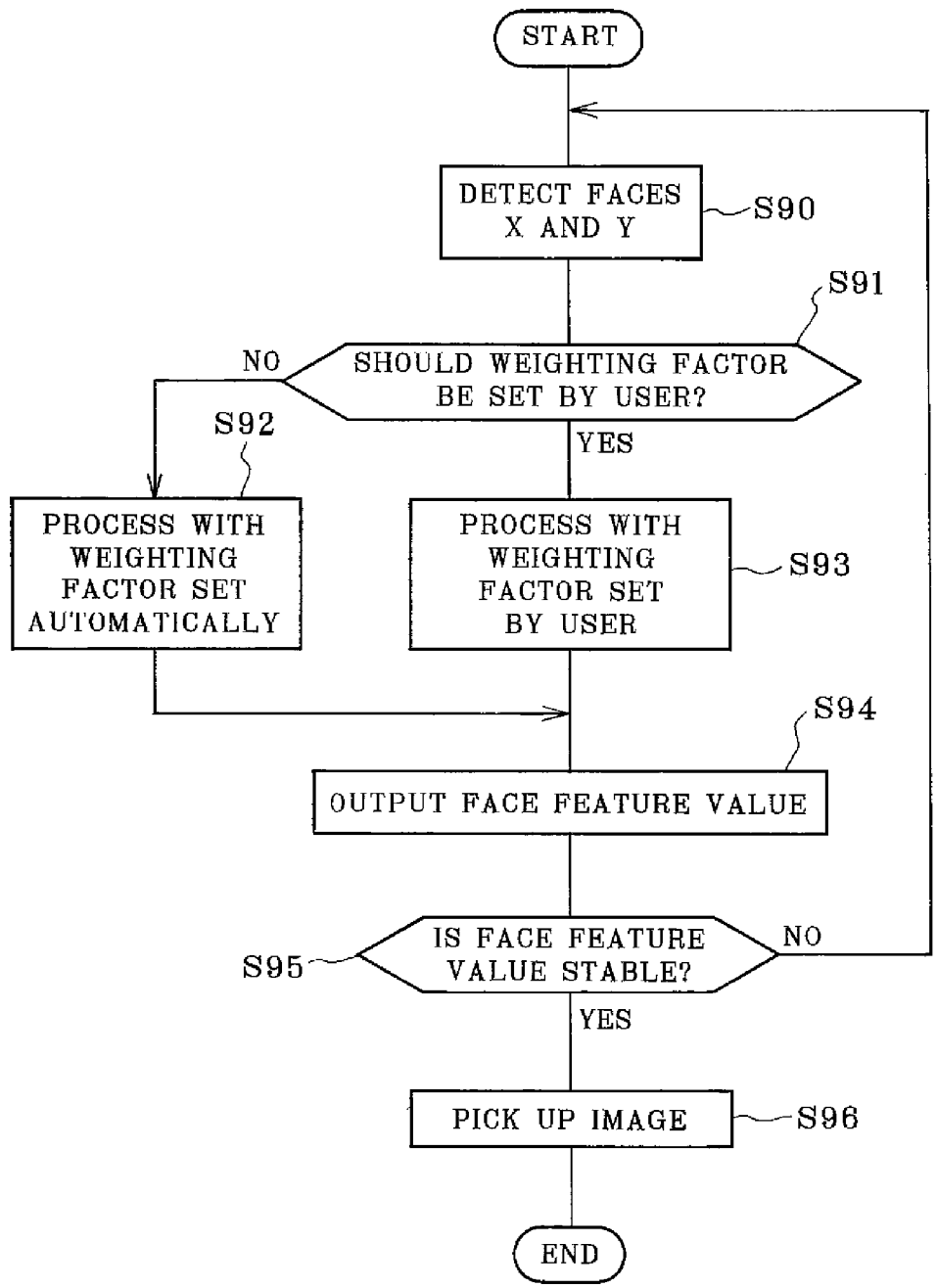
FIG. 17 is a flow chart illustrating a sequence in which weighting is used for face feature values.

FIG. 17 illustrates a flow for image pickup in which two face detection values LX and LY are weighted, to carry out the stability evaluation.

The first and second face detectors 46a and 46b, when supplied with image data, determine face feature values LX and LY. A face is detected if each of the face feature values LX and LY is equal to or more than a reference face feature value. See step S90.

The controller 11 at step S91 checks whether a weighting factor is predetermined by a user. If no weighting factor is found predetermined, then the weighting unit 51 determines a weighting factor automatically. In step S92, a face feature value is processed with the weighting factor. Then the operation proceeds to step S94.

If a weighting factor is found predetermined by a user, then the weighting unit 51 in step S93 weights the face feature value according to the weighting factor. Then the operation proceeds to step S94.

In step S94, the weighting unit 51 supplies the stability checker 23 with the face feature value being weighted. According to this, the stability checker 23 in step S95 checks whether the face feature value is stable or not. If it is not, then the operation returns to step S90 to repeat the sequence.

If the face feature value is found stable, then the controller 11 controls the various circuits to pick up an image in step S96. Then the image pickup operation is ended.

In the first and second embodiments, the start of the image pickup is controlled according to stability of the face feature value. Furthermore, it is possible to start the image pickup according to a combination of stability of other characteristic values with stability of the face feature value.

Figure 18:
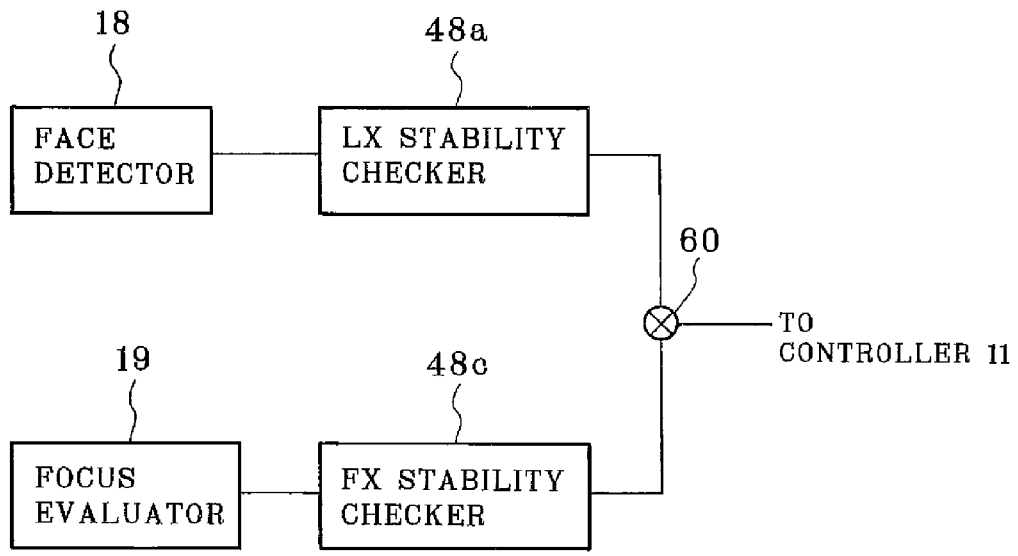
FIG. 18 is a block diagram schematically illustrating a sequence in which a focus evaluation value is combined with the face feature value.

Another preferred embodiment is described now, in which stability of another characteristic value is combined with stability of the face feature value to control the start of the image pickup. In FIG. 18, an example is illustrated in which a focus evaluation value is used. An FX stability checker or second stability checker 48c is incorporated in the camera in combination with the LX stability checker 48a. An AND circuit 60 as logical product circuit is connected to obtain a logical product of outputs of the LX stability checker 48a and the FX stability checker 48c.

The LX stability checker 48a is supplied with the face feature value LX by the face detector 18, checks stability of the face feature value LX, and sends an output of evaluation to the AND circuit 60. The FX stability checker 48c is supplied with the focus evaluation value FX by the focus evaluator 19, checks stability of the focus evaluation value FX, and sends an output of evaluation to the AND circuit 60. The FX stability checker 48c checks whether the focus evaluation value FX is within a prescribed range for a predetermined length of time. The parameters for stability evaluation are changeable with the condition input key 12b by a user.

The AND circuit 60 receives outputs of stability evaluation, and generates a logical product of the two. The controller 11 receives the logical product, and starts the image pickup according to the logical product.

The status of stability of the focus evaluation value FX represents the status of stability in the position of the object, in the control to start the image pickup in combination with the stability of the focus evaluation value FX. The image pickup is started when the position of an object is stabilized and when the face feature value is stabilized. Therefore, an image can be obtained in which an object position and face feature value are stable. Even if the person as object moves or swings his or her face, an image can be picked up when a motion of the face is stable.

The focus evaluation value FX may be any one of a focus evaluation value for the entirety of the image, a focus evaluation value for a partial area of the image, and a focus evaluation value for a face position in the image. The use of the focus evaluation value of the entirety of the image is effective in obtaining an image with a stabilized face feature value and with stable position in the entirety of the image. The use of the focus evaluation value of the face position is effective in obtaining an image with a stabilized face feature value and with a stable face position. Note that both of the focus evaluation values of the entirety of the image and of the face position can be used in combination. It is possible to start image pickup when stability of both of the focus evaluation values becomes high.

In the above description, the focus evaluation value FX of the focus evaluator 19 is utilized. However, a focus evaluation value detector of a specialized structure may be added separately from AF control, and used for the purpose of control of the starting the image pickup.

Figure 19:
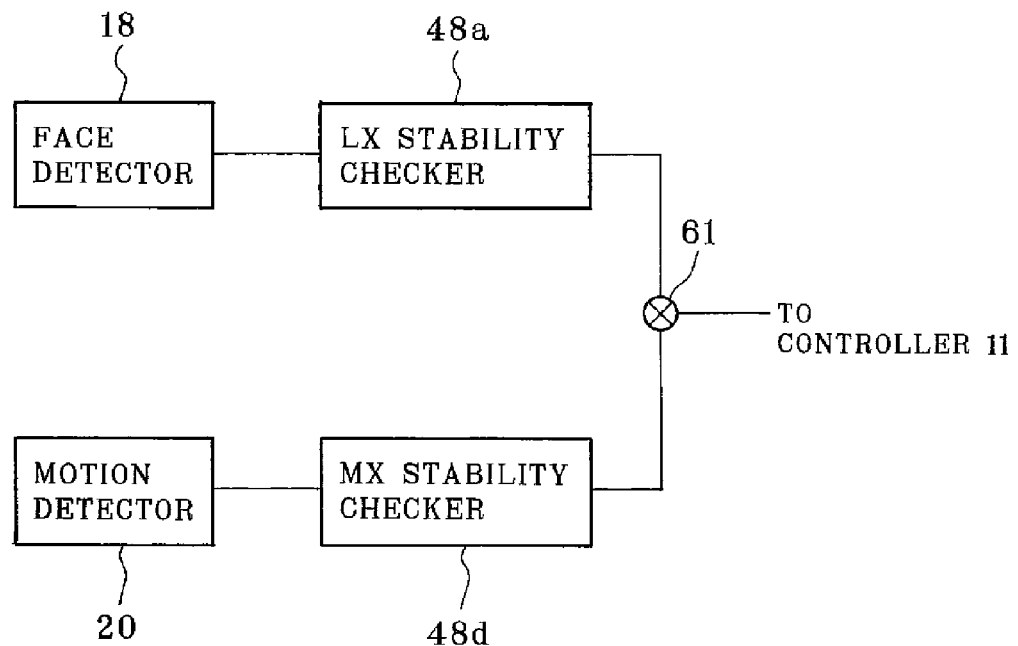
FIG. 19 is a block diagram schematically illustrating a sequence in which a motion characteristic value is combined with the face feature value.

In FIG. 19, one preferred embodiment is illustrated, in which stability of motion characteristic value MX is combined with stability of the face feature value to control the start of the image pickup. An MX stability checker or third stability checker 48d is combined with the LX stability checker 48a. An AND circuit 61 as logical product circuit creates an output of a logical product of outputs of the LX stability checker 48a and the MX stability checker 48d.

The MX stability checker 48d is supplied with the motion characteristic value MX by the motion detector 20, detects stability of the motion characteristic value MX, and sends a detection result to the AND circuit 61. In a manner similar to the stability checker 23, the MX stability checker 48d checks whether the motion characteristic value MX is within a prescribed range for a predetermined length of time. Note that parameters for stability evaluation are changeable by manual operation of the condition input key 12b. The AND circuit 61 receives outputs of stability evaluation, and outputs a logical product of the outputs of stability evaluation. The controller 11 is supplied with the data of the logical product, and controls the start of the image pickup.

The status of high stability of the motion characteristic value EX represents the status of high stability in location of the object, in the control to start the image pickup in combination with the stability of the motion characteristic value EX. Therefore, an image can be obtained in which object location and face feature value are stable. This is effective in photographing an image free from influence of camera shake.

The motion characteristic value MX may be any one of a motion characteristic value for the entirety of the image, a motion characteristic value for a partial area of the image, and a motion characteristic value for a face position in the image. The use of the motion characteristic value of the entirety of the image is effective in obtaining an image with a stabilized face feature value with stable motion in the entirety of the image.

In use of the motion characteristic value of the face position, it is possible to obtain an image with a stable face position and with stabilized face feature value. It is possible to use the face position obtained by face detection in the motion detection. This is effective also in a camera without a structure for correcting a camera shake.

Figure 20:
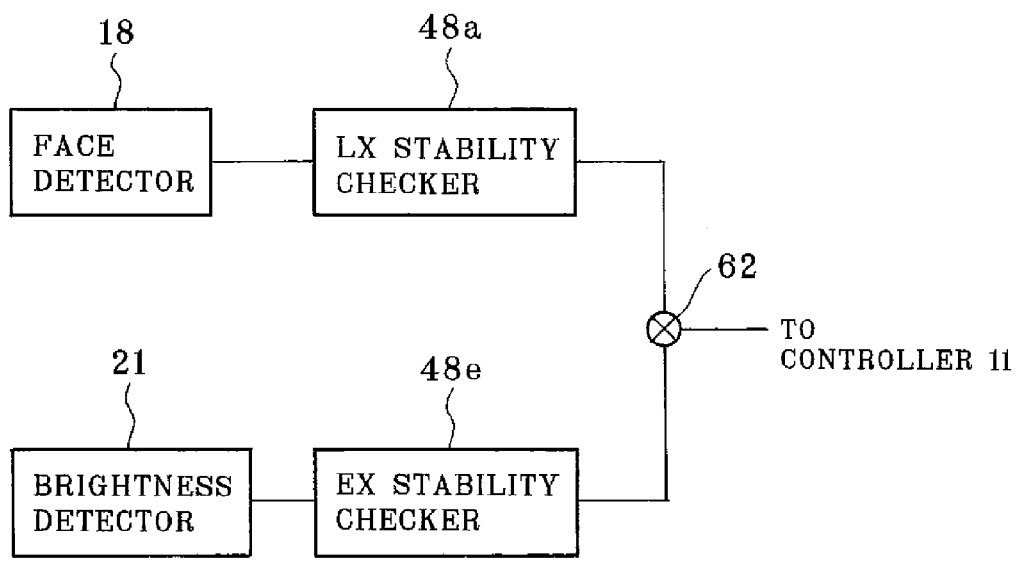
FIG. 20 is a block diagram schematically illustrating a sequence in which a brightness characteristic value is combined with the face feature value.

In FIG. 20, another preferred embodiment is illustrated in which a face feature value and brightness characteristic value are combined to start the image pickup. An EX stability checker or fourth stability checker 48e, and an AND circuit 62 as logical product circuit, are combined with the LX stability checker 48a.

The EX stability checker 48e is supplied with the brightness characteristic value EX by the brightness detector 21, evaluates stability of the brightness characteristic value EX, and sends an output to the AND circuit 62. In a manner similar to the stability checker 23, the EX stability checker 48e checks whether the brightness characteristic value EX is within a prescribed range consecutively for time of a predetermined length (or consecutively at times of a predetermined number of image pickup). Note that parameters for stability evaluation are changeable by manual operation of the condition input key 12b. The AND circuit 62 receives outputs of stability evaluation, and generates a logical product of the outputs of stability evaluation. The controller 11 is supplied with the data of the logical product, and controls the start of the image pickup.

The status of high stability of the brightness characteristic value EX represents the status of high stability in illumination of the object, in the control to start the image pickup in combination with the stability of the brightness characteristic value EX. Therefore, an image can be obtained in which object illumination and face feature value are stable.

The brightness characteristic value EX may be any one of a brightness characteristic value for the entirety of the image, a brightness characteristic value for a partial area of the image, and a brightness characteristic value for a face position in the image. In the condition of the brightness characteristic value for the entirety of the image, an image can be obtained in which object illumination and face feature value are stable.

The use of the brightness characteristic value of the face position is effective in obtaining an image with a stabilized face feature value with stable light in the face position. It is possible to obtain high precision in auto exposure by starting the image pickup when any one of the brightness characteristic values becomes stable. The use of the brightness characteristic value is effective in photographing a scene with a stabilized background even when a change occurs in the background, for example when a car passes by behind a principal object.

Figure 21:
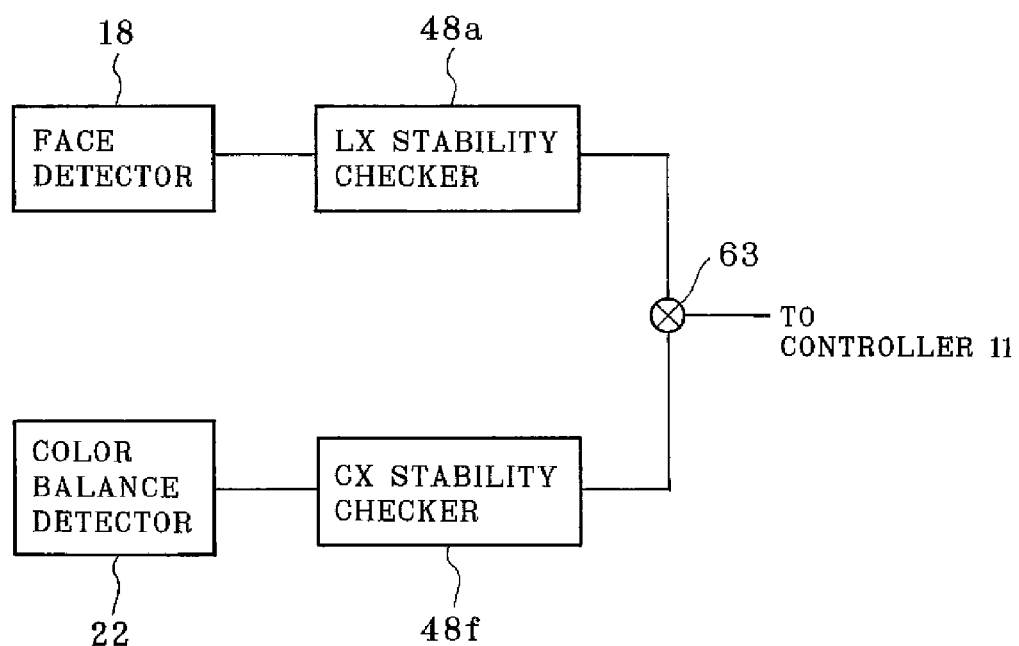
FIG. 21 is a block diagram schematically illustrating a sequence in which a color feature value is combined with the face feature value.

In FIG. 21, a preferred embodiment is illustrated in which a face feature value and color feature value are combined to start the image pickup. A CX stability checker or fifth stability checker 48f, and an AND circuit 63 as logical product circuit, are combined with the LX stability checker 48a.

The CX stability checker 48f is supplied with the color feature value CX by the color balance detector 22, and detects a status of the stability of the color feature value CX, and sends the detection result to the AND circuit 63. In a manner similar to the stability checker 23, the CX stability checker 48f checks whether the color feature value CX is stable consecutively for the period of the predetermined length (or at times of the predetermined number). The parameters for stability evaluation are changeable with the condition input key 12b by a user. The AND circuit 63 outputs a logical product of the outputs of stability evaluation. The controller 11 receives the logical product, and controls the start of the image pickup according to the logical product.

The status of high stability of the color feature value CX represents the status of high stability in color balance or illumination of the object, in the control to start the image pickup in combination with the stability of the color feature value CX. Therefore, an image can be obtained in which color balance of the object and face feature value are stable.

The color feature value CX may be any one of a color feature value for the entirety of the image, a color feature value for a partial area of the image, and a color feature value for a face position in the image. The use of the color feature value of the entirety of the image is effective in obtaining an image with a stabilized face feature value and with stable light in the entirety of the image. The use of the color feature value of the face position is effective in obtaining an image with a stabilized face feature value and with stable light in the face position. Another advantage is high precision of the automatic color adjustment by starting image pickup when any one of the color feature values becomes stable.

In the description related to FIGS. 18-21, the AX stability checker 48a and one combined stability checker are two blocks. However, a single block may be used for a stability checker. The single block can be operated in a manner of time sharing. Alternatively, partial operation may be carried out by the controller 11 in combination with the single block.

In the third preferred embodiment, the face feature value LX is combined with one of the focus evaluation value FX, motion characteristic value MX, brightness characteristic value EX and color feature value CX so as to start image pickup when the two combined values become stable. However, the face feature value LX may be combined with two or more of the focus evaluation value FX, motion characteristic value MX, brightness characteristic value EX and color feature value CX, for starting image pickup when all of the combined values become stable.

In the above embodiments, a face feature value only derived from a facial region of an object is used. However, other features of a face may be utilized. It is possible to select one of male and female statuses, detect a face of the selected male and female statuses, and start image pickup by detecting stability of the face feature value. For example, the female status is selected by a user. The image pickup is started when the face feature value becomes stable in detecting a female face by pattern recognition, namely a face of a lady. Thus, the number of good times of photographing a lady is greater, so the images of ladies with natural appearance of faces can be obtained.

In place of the selection of the sex, it is possible to select an age group, detect a face of the selected age group, and start image pickup by detecting stability of the face feature value. It is possible to set a greater number of good times of image pickup for an object of a predetermined age group. For example, a low age group is selected. The image pickup is started when the face feature value becomes stable in detecting a face of the low age group by pattern recognition, namely a face of a child. Thus, the number of good times of photographing a child is greater, so the images of children with natural appearance of faces can be obtained.

Furthermore, it is possible to predetermine facial expressions of specific types. A user may select one of the facial expressions. A face with the facial expression is detected according to the selection, before detecting a status of the stability of the face feature value to start image pickup. This is effective in raising the number of very good moments for a shot of an object of the facial expression. For example, when smile is selected as facial expression, a face with smile can he photographed in a good state. Other examples of facial expressions are a tear-stained face, sad face, angry face, embarrassed face and the like.

Also, it is possible to predetermine human postures of specific types at the face. A user may select one of the postures. A face having made the posture is detected according to the selection, before detecting a status of the stability of the face feature value to start image pickup. This is effective in raising the number of very good moments for a shot of an object of the posture. An example of the posture is yawning. A face of a person having yawned can be detected, and photographed with stability. The face in the yawning state can be photographed exactly.

Other examples of human postures are a sleeping person, awakened person and the like. If a user wishes to photograph a face of a sleeping child, then the sleeping person as posture can be selected in framing the child. Furthermore, the setting of a human posture can be used for interrupting the image pickup operation if at least one of persons as object happens to yawn in the scene.

Furthermore, it is possible to have a user to select one of country zones, and to pick up an image when the face feature value becomes stable if a person of the country zone is detected according to the feature of the face. Also, world regional areas, each of which includes plural country zones, may be selected by a user. The world regional areas can be Asia, Europe, and the like. Alternatively, it is possible to have a user to select one of races or peoples instead of country zones, namely skin color. Examples of peoples are Mongoloid race or yellow people, and the like, and can be stored in database. Let a family include members of only yellow people. If the family travel in Europe, turning on of the detection of the yellow people is effective in reducing possibility of detecting native European persons. Also, database can be used to store only the members of the family, so as to raise the precision in the detection.

It is preferable to store pattern images in the reference vector storage 34 for detecting persons of predetermined sexes, age groups, facial expressions, human postures, country zones, world regional areas, skin colors, and the like. Any of those can be detected by referring to the pattern image according to pattern recognition.

In the above description, an object moves. However, an object, which may not move, can change in its visual appearance. For example, a vehicle runs in an outdoor scene at night. A person is illuminated by vehicle lamps. A face of the person changes in its illuminated portions. For example, a shadow with changes occurs on the face. Also, density of the flesh color of the face changes with time.

In the embodiment, the image pickup unit 14 is incorporated in the digital still camera 10. However, a camera unit with the image pickup unit 14 may be initially separate and mounted on the outside of a body of the digital still camera 10. Image data and other data can be transmitted from the image pickup unit 14 by use of the communication interface 13.

In the above embodiment, the image pickup apparatus is the digital still camera. However, an image pickup apparatus can be a camera built-in cellular phone, digital video camera, and the like.

An image pickup apparatus of the invention can be a motion picture camera, a consecutive taking camera for a plural frames and the like, instead of the digital still camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image pickup apparatus comprising:
an image pickup unit for photographing an object image, to obtain image data;
an object detector for determining specific object feature values each of which is characteristically associated with each of specific objects according to said image data prior to image recording, to detect presence of said specific objects at said object image;
a first stability checker for monitoring said specific object feature values to determine that each of said specific object feature values is stable when each of said specific object feature values is within a prescribed range consecutively for time of a predetermined length or consecutively for a predetermined number of times, and for outputting stable result information for said specific object feature values as determined stable;
a priority input unit for setting priority for said first stability checker;
a result selector for checking whether the priority is set by said priority input unit, wherein when the priority is set, said result selector selects one of said stable result information in accordance with said priority, and when the priority is not set, said result selector selects one of said stable result information which indicates the lowest stability; and a controller for automatically starting image pickup of said image pickup unit for image recording when said stable result information selected by said result selector is determined stable.

2. An image pickup apparatus as defined in claim 1, wherein said specific object is a human face.

3. An image pickup apparatus as defined in claim 1, further comprising a release switch shiftable in a halfway depressed state and a fully depressed state;

wherein said controller, when said release switch is in said halfway depressed state, causes said first stability checker to start detection of said specific object feature value, and when said release switch is in said fully depressed state, starts said image pickup for image recording in response to said stable result information.

4. An image pickup apparatus as defined in claim 1, further comprising a condition input unit for setting one of time of said predetermined length and said predetermined number of times, and said prescribed range.

5. An image pickup apparatus as defined in claim 1, further comprising a logical product circuit for generating a logical product of said stable result information of plural specific objects from said first stability checker if said object detector detects said plural specific objects;

wherein when a status of said logical product is that said stable result information exists for any of said specific objects, said controller controls a start of said image pickup.

6. An image pickup apparatus as defined in claim 1, further comprising a weighting unit for multiplying specific object feature values by weighting factors and for obtaining a weighted feature value by adding up if said object detector detects plural specific objects;

wherein said first stability checker checks according to said weighted feature value obtained by said weighting unit.

7. An image pickup apparatus as defined in claim 1, further comprising a mode selector for setting one of a normal starting mode and an automatic starting mode adapted to image recording, wherein when said normal starting mode is set, said image pickup is started upon an input of instruction of said image pickup, and when said automatic starting mode is set, said image pickup is automatically started in response to said stable result information.

8. An image pickup apparatus as defined in claim 1, wherein after start of said image pickup, said controller discontinues or suppresses said image pickup when said specific object feature value becomes outside a prescribed range consecutively for time of said predetermined length or consecutively for said predetermined number of times.

9. An image pickup apparatus as defined in claim 1, wherein said object detector detects a face of a person with a selected one of predetermined visual attributes, and said visual attributes are at least one of a male or female status, age group, facial expression, country zone, world regional area, and skin color of said person.

10. An image pickup control device comprising:

an object detector that determines specific object feature values each of which is characteristically associated with each of specific objects according to image data obtained prior to image recording by an image pickup unit for photographing an object image, to detect presence of said specific objects at said object image;

a first stability checker that monitors said specific object feature values to determine that each of said specific object feature values is stable when each of said specific object feature values is within a prescribed range consecutively for time of a predetermined length or consecutively for a predetermined number of times, and that outputs stable result information for said specific object feature values as determined stable;

a priority input unit that sets priority for said first stability checker;

a result selector that checks whether the priority is set by said priority input unit, wherein when the priority is set, said result selector selects one of said stable result information in accordance with said priority, and when the priority is not set, said result selector selects one of said stable result information which indicates the lowest stability; and a controller that automatically starts image pickup of said image pickup unit for image recording when said stable result information selected by said result selector is determined stable.

11. An image pickup control device as defined in claim 10, wherein said specific object is a human face, and said specific object feature value is a face feature value of evaluated possibility of said human face.

12. An image pickup control method comprising:

determining specific object feature values each of which is characteristically associated with each of specific objects according to image data obtained prior to image recording by an image pickup unit for photographing an object image, to detect presence of said specific objects at said object image;

monitoring said specific object feature values to determine that each of said specific object feature values is stable when each of said specific object feature values is within a prescribed range consecutively for time of a predetermined length or consecutively for a predetermined number of times, and outputting stable result information for said specific object feature values as determined stable;

setting priority for said monitoring of said specific object feature values;

checking whether the priority is set, wherein when the priority is set, selecting one of said stable result information in accordance with said priority, and when the priority is not set, selecting one of said stable result information which indicates the lowest stability; and automatically starting image pickup of said image pickup unit for image recording when said selected stable result information is determined stable.

13. An image pickup control method as defined in claim 12, wherein said specific object is a human face, and said specific object feature value is a face feature value of evaluated possibility of said human face.

14. An image pickup control method as defined in claim 12, wherein a release switch is used, and is shiftable in a halfway depressed state and a fully depressed state;

wherein when said release switch is in said halfway depressed state, said determining step of said specific object feature value is started, and when said release switch is in said fully depressed state, said image pickup is started in response to said stable result information.

* * * * *